United States Patent [19]

Ogawa et al.

[11] Patent Number: 5,373,377
[45] Date of Patent: Dec. 13, 1994

[54] LIQUID CRYSTAL DEVICE WITH SHORTING RING AND TRANSISTORS FOR ELECTROSTATIC DISCHARGE PROTECTION

[75] Inventors: Meiko Ogawa, Tokyo; Kouhei Suzuki, Yokohama; Hiroaki Kitahara, Tokyo; Shinichi Kimura, Sagamihara; Yoshikazu Ichioka, Himeji, all of Japan

[73] Assignees: Kabushiki Kaisha Toshiba, Kawasaki, Japan; International Business Machines Corporation, Armonk, N.Y.

[21] Appl. No.: 14,162

[22] Filed: Feb. 5, 1993

[30] Foreign Application Priority Data

Feb. 21, 1992 [JP] Japan ................................. 4-34919

[51] Int. Cl.⁵ .............................................. G02F 1/343
[52] U.S. Cl. ......................... 359/59; 359/87; 359/54; 257/356
[58] Field of Search ............. 359/54, 55, 58, 59, 359/60, 87; 257/355, 356, 357, 358, 359, 360, 361, 362, 363

[56] References Cited

U.S. PATENT DOCUMENTS

| | | | |
|---|---|---|---|
| 5,087,955 | 2/1992 | Futami | 257/355 |
| 5,159,477 | 10/1992 | Shimada et al. | 359/54 |
| 5,162,901 | 11/1992 | Shimada et al. | 359/54 |
| 5,220,443 | 6/1993 | Naguchi | 257/356 |

FOREIGN PATENT DOCUMENTS

| | | |
|---|---|---|
| 0143038 | 5/1985 | European Pat. Off. . |
| 0423824 | 4/1991 | European Pat. Off. . |
| 59-126663 | 7/1984 | Japan . |
| 59-143368 | 8/1984 | Japan . |
| 6159475 | 3/1986 | Japan . |
| 63-220289 | 9/1988 | Japan . |

OTHER PUBLICATIONS

Patent Abstracts of Japan, vol. 11, No. 261 (P-609) (2708), Aug. 25, 1987 & JP-A-62-66231, Mar. 25, 1987.
Patent Abstracts of Japan, vol. 13, No. 572 (P-978), Dec. 18, 1989 & JP-A-1-239531, Sep. 25, 1989.

*Primary Examiner*—Anita Pellman Gross
*Assistant Examiner*—Kenneth Parker
*Attorney, Agent, or Firm*—Oblon, Spivak, McClelland, Maier, & Neustadt

[57] ABSTRACT

An active matrix type liquid crystal display device with a short-circuiting wire for mutually short-circuiting address wires and data wires through the medium of resistors made of a thin-film transistor is formed along the periphery of a display region on an insulating substrate. The short-circuiting wire is electrically connected inside a region in which the resistors made of a thin-film transistor are formed. In one embodiment, the transistors are surrounded by a portion of the shod circuiting wire. In another embodiment, they are partially surrounded by the wire with a gate electrode which is not protruding out. In another embodiment they are formed with two source and drain regions, one which has a lower breakdown voltage than the other.

21 Claims, 28 Drawing Sheets

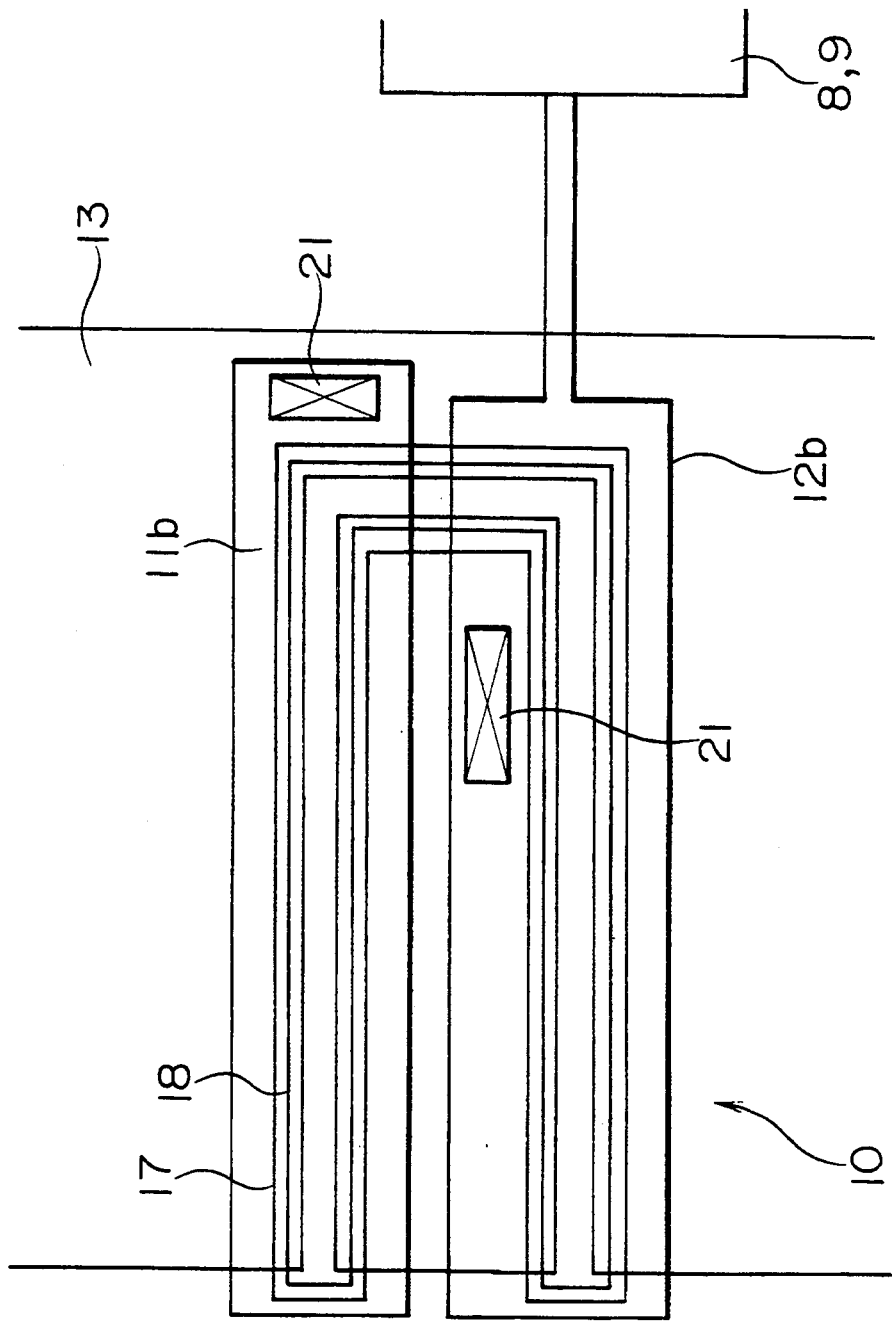

LIQUID CRYSTAL DEVICE WITH SHORTING RING AND TRANSISTORS FOR ELECTROSTATIC DISCHARGE PROTECTION

BACKGROUND OF THE INVENTION

1. Field of the Invention

This invention relates to a liquid crystal display device to be used for displays such as in portable TV sets and lap-top personal computers, for example.

2. Description of the Related Art

The liquid crystal displays (liquid crystal display devices) weigh light, permit a decrease in thickness, and consume only a small amount of electric power and, owing to these benefits, have found utility in such applications as displays for portable TV sets and lap-top personal computers. Research directed to the development of liquid crystal displays of larger dimensions and higher degrees of accuracy are now underway.

As a matrix substrate for driving a liquid crystal, the active matrix substrate which has mutually intersecting sets each of a plurality of address wires and data wires and a thin-film transistor (or MIM element) formed of amorphous Si (hereinafter referred to briefly as "a-Si") or poly Si (hereinafter referred to briefly as "p-Si"), for example, laid out on a substrate has been known. The liquid crystal display device is constructed by airtightly interposing a liquid crystal between this liquid crystal-driving active matrix substrate and a counter substrate.

Incidentally, the liquid crystal-driving active matrix substrate of this sort is generally tested, during the process of production, to conform the effective lighting condition of the component picture elements and detect any possible line defect in address wires and data wires, for example.

As a means for protecting the liquid crystal-driving active matrix substrate of this sort against degradation by static electricity, the construction in which the address wires and data wires are short-circuited with a short-circuiting wire formed of a wiring material in a region outside the display region as disclosed in Japanese Unexamined Patent Publication No. 59,475/1986 has been known.

When the address wires and data wires are short-circuited in the manner described above, however, though the detection of a line defect in the address wires and data wires is attainable, the test for confirming the effective lighting condition of the component picture elements is not attainable unless the short-circuiting wire is cut off. Moreover, since the short-circuiting wire has been cut off by the time that the liquid crystal display device is completed, the produced construction is susceptible to the influence of static electricity.

To cope with this problem, the idea of establishing electrical interconnection severally between the address wires and data wires or between the individual wires as through the medium of a two-terminal operation thin-film transistor has been conceived as disclosed in Japanese Unexamined Patent Publication No. 220,289/1988, for example.

Since the short-circuiting wire for establishing electrical interconnection between the address wires and other wires as described above is formed as disposed in the region outside the display region, namely along the periphery of the liquid crystal-driving active matrix substrate, however, it has the problem of readily succumbing to wire disconnection due to breakage after the produced substrate is cut out in a prescribed size.

Though this problem can be coped with by interposing a gap of at least several hundred μm between the outer edge of the substrate and the short-circuiting wire, this insertion of the gap entails the problem of enlarging the substrate.

Besides, since the two-terminal operation thin film transistor which is interposed between the address wires and other wires and the short-circuiting wire is subjected to application of static electricity of fairly high voltage, it has the problem of readily succumbing to wire disconnection due to breakage caused by the static electricity.

There are times when the gate electrode of the two-terminal operation thin-film transistor is formed on the short-circuiting wire through the medium of an insulating film. Since the leading terminal of the gate electrode is liable to sustain local damage by static electricity owing to the application of the static electricity of high voltage, the disadvantage ensues that the address wires and data wires leading to the gate electrode are short-circuited to the short-circuiting wire and, as a result, the confirmation of the effective lighting condition of the component picture elements becomes no longer obtainable. Once this short-circuit is suffered to occur, the disadvantage arises that a defective display will appear when the liquid device is turned on without separation of the short-circuiting wire.

In the conventional liquid crystal display device, the idea of establishing electrical interconnection severally between the address wires and data wires through the medium of the two-terminal operation thin film transistor is conceived as described above for the purpose of protecting the device against the mischief of static electricity and detecting a point defect during the process of production. When the substrate is cut out in the prescribed size, the problem of the short-circuiting wire readily succumbing to disconnection due to breakage, the problem of the two-terminal operation thin-film transistor readily succumbing to disconnection due to breakage caused by static electricity, and the problem of the address wires and data wires being readily short-circuited to the short-circuiting wire due to local breakage of the leading terminals of the date electrode by static electricity are liable to occur.

SUMMARY OF THE INVENTION

This invention has originated in the urge to overcome the various problems mentioned above.

The first object of this invention is to provide a liquid crystal display device which allows a dimensional reduction in a substrate possessing an insulating surface (hereinafter referred to briefly as "insulating substrate") and succumbs only sparingly to disconnection of circuit by breakage.

The second object of this invention is to provide a liquid crystal display device which succumbs only sparingly to disconnection of circuit due to breakage caused by static electricity.

The third object of this invention is to provide a liquid crystal display device which is incapable of establishing continuity between address wires and data wires leading to a gate electrode on the one part and a short-circuiting wire on the other part even when the application of static electricity of high voltage inflicts local damage of static electricity on the leading terminal of the gate electrode.

To accomplish the objects described above, the first aspect of this invention is directed to a liquid crystal display device comprising an insulating substrate, a plurality of address wires formed in a display region on the insulating substrate, a plurality of data wires formed in such a manner as to intersect the address wires, thin-film transistors formed one each at the points of intersection of the address wires and data wires and having gate electrodes electrically connected to the address wires and drain electrodes electrically connected to the data wires, picture element electrodes formed one each near the points of intersection mentioned above and electrically connected to the source electrodes of the thin-film transistors, and a short-circuiting wire formed along at least part of the periphery of the display region of the insulating substrate and adapted to short-circuit the address wires and data wires to each other through the medium of a resistor made of a thin-film transistor, which liquid crystal display device is characterized by the fact that the short-circuiting wire formed along at least part of the periphery of the display region of the insulating substrate is electrically connected inside a region in which the resistor made of the thin-film transistor is formed.

The second aspect of this invention is directed to a liquid crystal display device comprising an insulating substrate, a plurality of address wires formed in a display region on the insulating substrate, a plurality of data wires formed in such a manner as to intersect the address wires, thin-film transistors formed one each at the points of intersection of the address wires and data wires and having gate electrodes electrically connected to the address wires and drain electrodes electrically connected to the data wires, picture element electrodes formed one each near the points of intersection mentioned above and electrically connected to the source electrodes of the thin-film transistors, and a short-circuiting wire formed along at least part of the periphery of the display region of the insulating substrate and adapted to short-circuit the address wires and data wires to each other through the medium of a resistor made of a thin-film transistor, which liquid crystal display device is characterized by the fact that opposed source electrodes and drain electrodes of the thin-film transistor interposed between the address wires and data wires on the one part and the short-circuiting wire on the other part are formed each in the shape of a comb or the channels of the thin-film transistor are formed linearly or zigzaggedly in directions perpendicular to the address wires and data wires.

The third aspect of this invention is directed to a liquid crystal display device comprising an insulating substrate, a plurality of address wires formed in a display region on the insulating substrate, a plurality of data wires formed in such a manner as to intersect the address wires, thin-film transistors formed one each at the points of intersection of the address wires and data wires and having gate electrodes electrically connected to the address wires and drain electrodes electrically connected to the data wires, picture elements formed one each near the points of intersection mentioned above and electrically connected to the source electrodes of the thin-film transistors, and a short-circuiting wire formed along at least part of the periphery of the display region of the insulating substrate and adapted to short-circuit the address wires and data wires to each other through the medium of a resistor made of a thin-film transistor, which liquid crystal display device is characterized by the fact that the leading terminal of the gate electrode of the thin-film transistor of which the resistor is made is protruded from the short-circuiting wire.

The liquid crystal display device of this invention allows a dimensional reduction in the insulating substrate and succumbs only sparingly to disconnection of circuit due to breakage because the short-circuiting wire formed along the periphery of the display region on the insulating substrate is electrically connected inside the region in which the resistor made of the thin-film transistor is formed.

Further, the liquid crystal display device succumbs only sparingly to disconnection of circuit due to damage caused by static electricity because the source electrode opposed to the thin-film transistor interposed between the address wires and data wires on the one part and the short-circuiting wire on the other part and the drain electrodes are severally shaped like a comb or the channels of the thin-film transistor are formed linearly or zigzaggedly in directions perpendicular to the address wires and data wires.

Since the leading terminal of the gate electrode of the thin-film transistor of which the resistor is made is protruded from the short-circuiting wire, the address wires and data wires to the gate electrode are incapable of establishing continuity to the short-circuiting wire even when the application of static electricity of high voltage inflicts a local damage of static electricity on the leading terminal of the gate electrode.

The liquid crystal display device of this invention is enabled, therefore, to acquire improved reliability of performance by precluding the short-circuiting wire and the thin-film transistor from otherwise possible disconnection or defective short-circuiting.

BRIEF DESCRIPTION OF THE DRAWINGS

FIG. 6 is a plan view of a TFT resistance part of the second embodiment of this invention.

DESCRIPTION OF PREFERRED EMBODIMENT

Now, embodiments of this invention will be described below.

Figure 1:
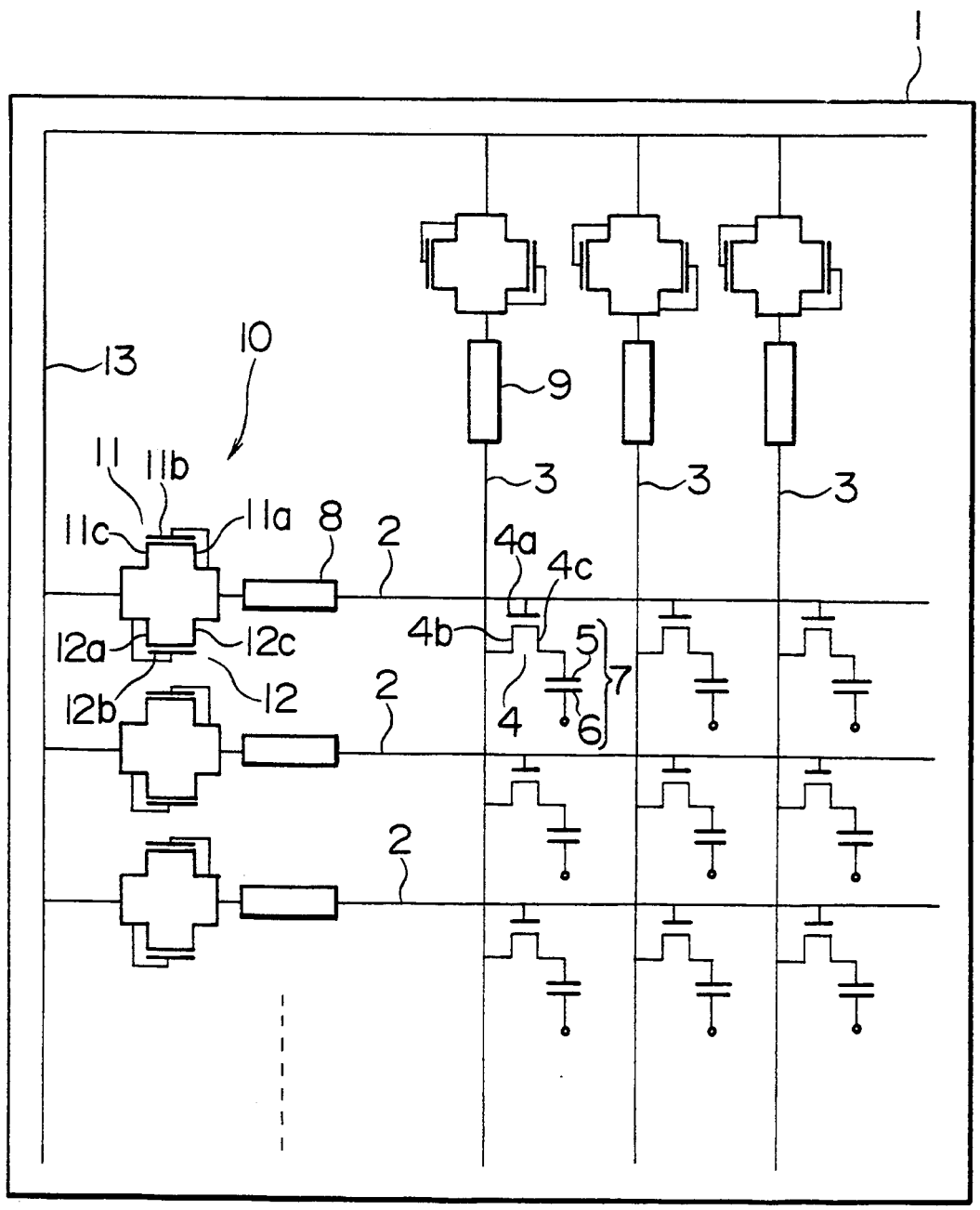
FIG. 1 is an equivalent circuit diagram of the first embodiment of this invention.

An equivalent circuit diagram of a liquid crystal display device as the first embodiment of this invention is shown in FIG. 1. In the diagram, 1 stands for an insulating substrate.

In the display region on the insulating substrate 1, a plurality of address wires 2, 2, ... and a plurality of data wires 3, 3, ... adapted to intersect the address wires 2, 2, ... are formed.

Thin-film transistors (hereinafter referred to briefly as "TFT") are formed one each at the points of intersection of the address wires 2 and data wires 3, with the gate electrodes 4a thereof electrically connected to the data wires 3, the drain electrodes 4b thereof electrically connected to the data wires 3, and the source electrodes 4c thereof electrically connected to picture element electrodes 5 which are formed one each near the points of intersection.

Capacitors 7 are formed by interposing a liquid crystal (dielectric) between the picture element electrodes and their counter substrates 6.

The address wires 2 and data wires 3 are severally extended beyond the display region and electrically connected to driving pulse input pads 8 and 9 which are formed in the extended parts of these wires.

The address wires 2 and data wires 3 are severally extended further beyond the driving pulse input pads 8 and 9 and connected electrically to resistors 10.

Now, the construction of each resistor 10 will be described specifically below.

The resistor 10 is composed of two TFT's 11 and 12.

A drain electrode 11a and a gate electrode 11b of the TFT 11 and a source electrode 12c of the TFT 12 are electrically connected to the driving pulse input pad 8 (or 9).

A drain electrode 12a and a gate electrode 12b of the TFT 12 and a source electrode 11c of the TFT 11 are electrically connected to a short-circuiting wire 13 which are intended for mutually short-circuiting all the resistors 10.

Figure 2:
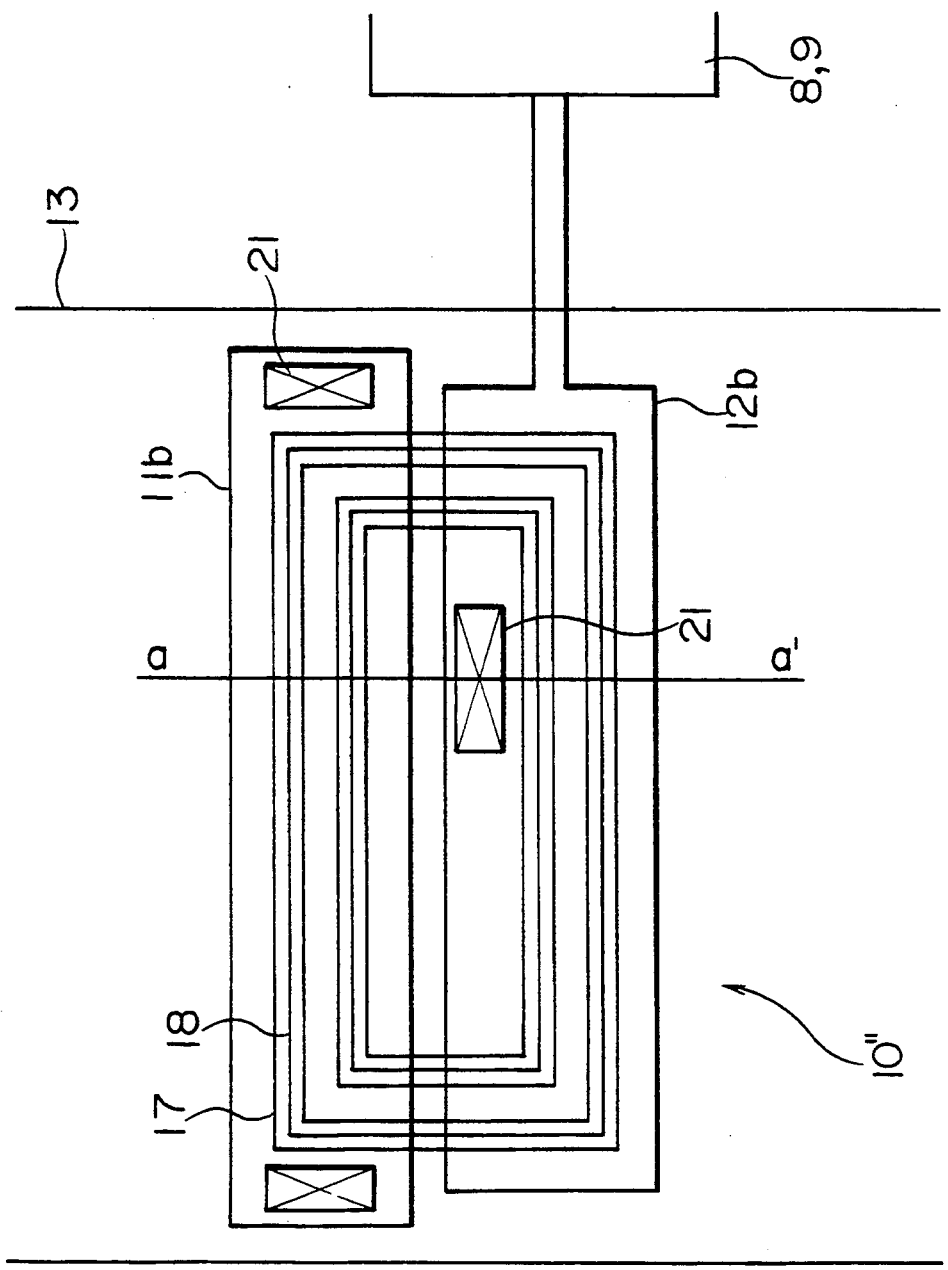
FIG. 2 is a plan view of a TFT resistance part of the first embodiment of this invention.
Figure 3:
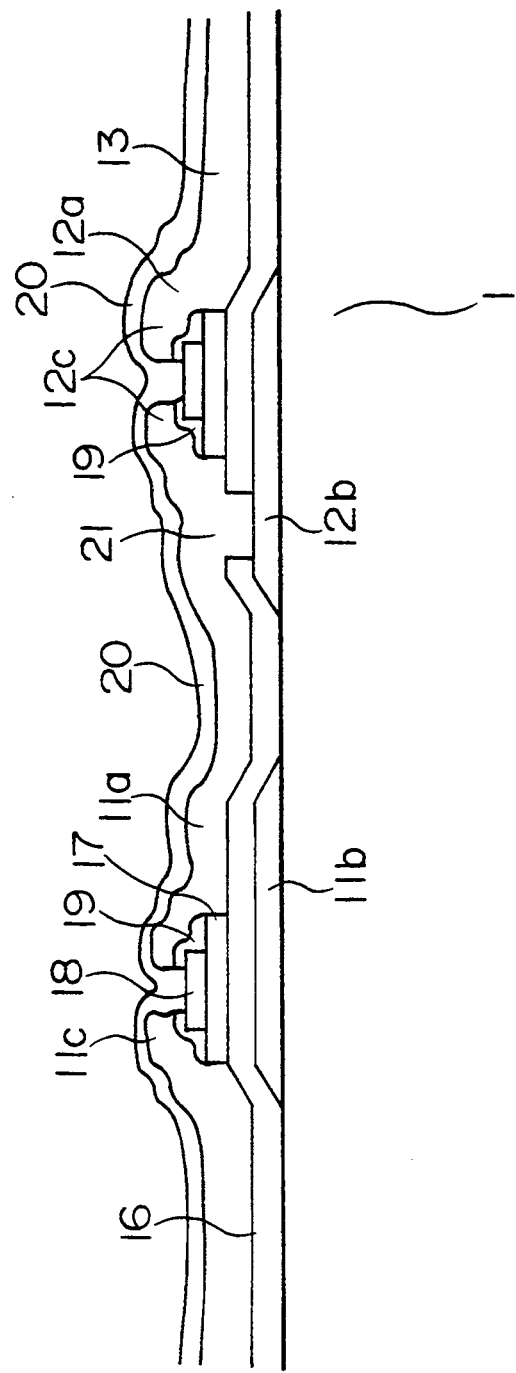
FIG. 3 is a longitudinally sectioned front view of the TFT resistance part of the first embodiment of this invention.

A magnified diagram of one resistor 10 and the part of the short-circuiting wire 13 approximating it is shown in FIG. 2 and a magnified cross section taken through FIG. 2 along the line a—a' is shown in FIG. 3.

As illustrated in FIG. 2, the resistor 10 is formed in a region corresponding to the central part of the short-circuiting wire 13. The short-circuiting wire 13 is electrically connected on the inner side than the resistor 10. Further, the short-circuiting wire 13 is formed in the shape of a ladder along the periphery of the insulating substrate 1.

The gate electrodes 11b and 12b are formed on the insulating substrate 1 and a gate-insulating film 16 is formed so as to cover these gate electrodes as illustrated in FIG. 3.

On the gate-insulating film 16, the drain electrodes 11a and 12a and the source electrodes 11c and 12c are formed through the medium of an a-Si film 17, a channel-protecting film 18, and a n+ a-Si film 19.

Then, a protective insulating film 20 is formed so as to cover these electrodes.

The drain electrodes 11a and 12a and the gate electrodes 11b and 12b are electrically interconnected by a through hole 21.

In the liquid crystal display device constructed in the manner described above, when the address wires 2 or data wires 3 are electrostatically charged positively or negatively relative to the potential of the short-circuiting wire 13 during the process of production of the device, an electric current flows via the resistors 10 between the address wires 2 or data wires 3 and the short-circuiting wire 13 in the direction of canceling the electric charge and serves the purpose of repressing the voltage to be generated between the address wires 2 (or data wires 3) and the short-circuiting wire 13 or further the data wires 3 (or address wires 2). Further, owing to the insertion of the resistors 10 between the address wires 2 and data wires 3 on the one part and the short-circuiting wire 13 on the other part, the TFT characteristics within the display region can be determined without requiring severance of the short-circuiting wire 13.

Figure 4:
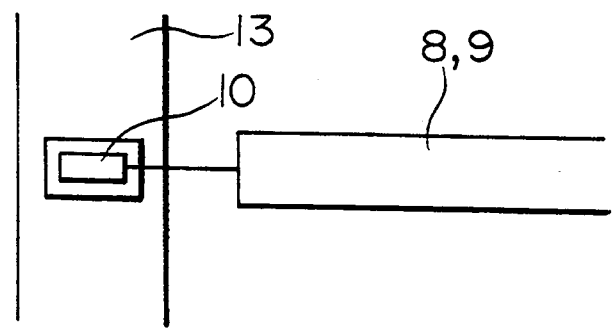
FIGS. 4(a) and 4(b) are diagrams for aiding in the explanation of the effect of the first embodiment of this invention.
Figure 4:
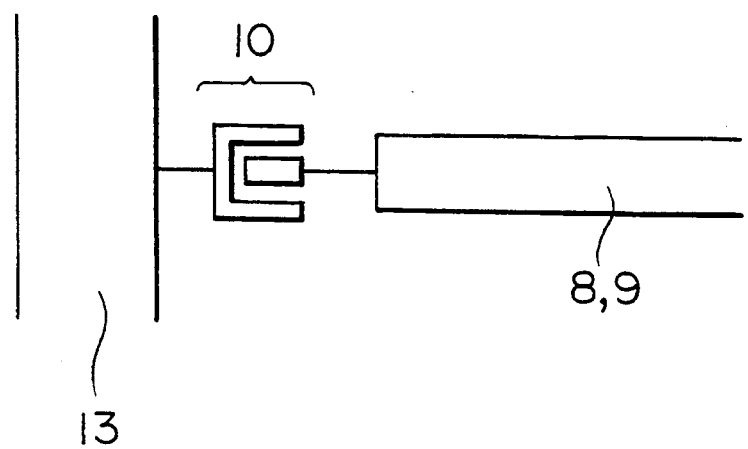
Figure 5A:
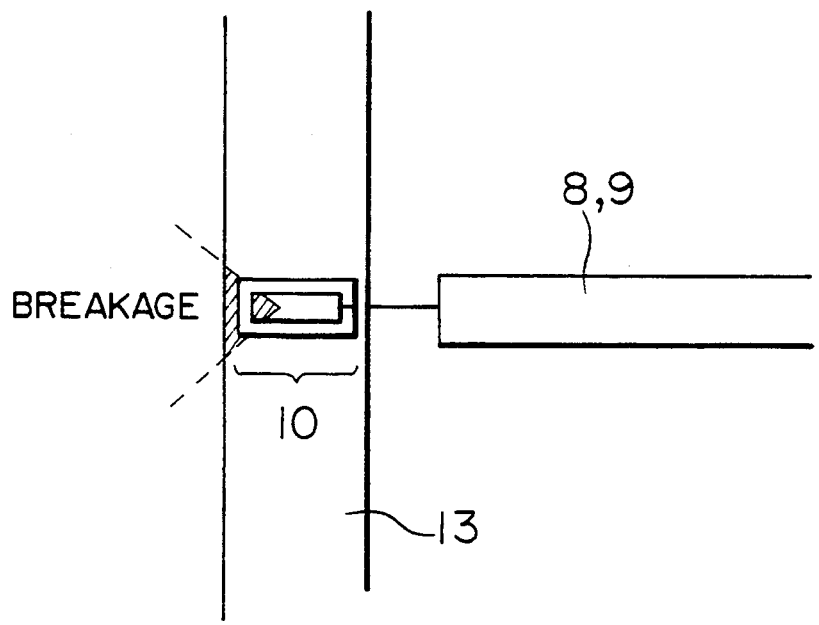
FIG. 5(a) and 5(b) are diagrams for aiding in the explanation of the effect of the first embodiment of this invention.
Figure 5B:
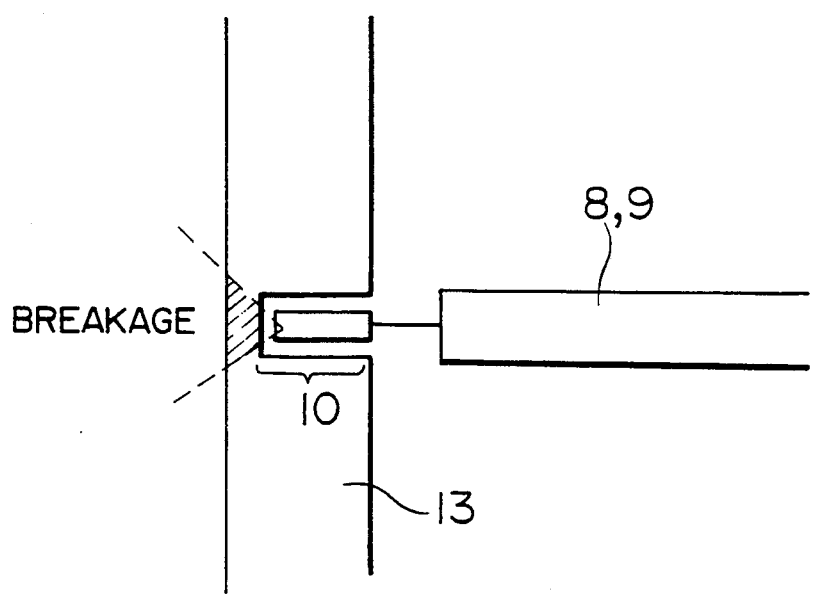

Moreover, in the liquid crystal display device of this invention, since the resistor 10 is formed in the region falling in the central part of the short-circuiting wire 13 as illustrated in FIG. 4(a), the insulating substrate 1 is allowed a dimensional reduction as compared with the construction in which the resistor 10 is formed inside the short-circuiting wire 13 as illustrated in FIG. 4(b). Further, since the short-circuiting is electrically connected on the inner side to the resistor 10 as illustrated in FIG. 5(a), the susceptibility of the device to disconnection due to breakage is less than if the short-circuiting wire 13 was not electrically connected on the inner side of the resistor 10 as illustrated in FIG. 5(b). This is because the breakage of the insulating substrate 1 is liable to originate from the outer edge of the substrate.

Now, the method of producing this liquid crystal display device will be described below (FIG. 3).

(1) On the insulating substrate 1 such as, for example, a glass substrate, the address wires 1, the gate electrodes 11b and 12b, and the address wire-driving pulse input pads 8 and 9 are formed by coating the insulating layer 1 with a film of the first wiring material such as, for example, MoTo, in a thickness of 250 nm by the spattering process and etching the applied coat by patterning and chemical dry etching (hereinafter referred to briefly as "CDE").

(2) A $SiO_X$ film about 350 nm in thickness is formed as the gate-insulating film 16 by the plasma CVD process.

(3) $SiN_X$ films 50 nm and 100 nm in thickness are formed respectively as the a-Si film 17 and the channel-protecting film 18 by the plasma DVD process.

(4) The $SiN_X$ film for the channel-protecting film 18 is etched for the purpose of patterning with a hydrofluoric acid type etching solution.

(5) The n+ a-Si film 19 is formed in a thickness of 50 nm by the plasma CVD process to establish contact between the source electrodes 11c and 12c on the one part and the drain electrodes 11a and 12a on the other part.

(6) The n+ a-Si film 19 and the a-Si film 17 are etched by the CDE process for the purpose of patterning the a-Si film 17.

(7) An ITO film 100 nm in thickness is formed as the picture element electrodes 5 by the spattering process and this film is patterned by etching with an aqua regina type etching solution.

(8) The gate-insulating through hole 21 for the date-insulating film 16 is patterned by etching with an aqueous ammonium fluoride solution.

(9) Films of the second wiring materials Cr and Al are formed in respective thicknesses of 50 nm and 500 nm by the spattering process. The data wires 3, the source electrodes 11c and 12c, and the data wire-driving pulse input pads 8 and 9 are formed by patterning the Cr and Al films by etching with a mixed solution of nitric acid, phosphoric acid, and acetic acid and an aqueous ammonium cerium nitrate solution.

(10) The part of the n+ a-Si film 19 exposed through the gaps between the source electrodes 11c and 12c on the one part and the drain electrodes 11a and 12a on the other part is removed by masking the source electrodes 11c and 12c and the drain electrodes 11a and 12a and etching the exposed part by the CDE process.

(11) A $SiN_X$ film 200 nm in thickness is formed as the protective insulating film 19 by the plasma CVD process and the through hole 21 in the protective insulating film is patterned by etching by the reactive ion etching (hereinafter referred to briefly as "RIE') process.

The liquid crystal-driving active matrix substrate aimed at by this invention can be produced by the method described above.

Since the TFT's 11 and 12 which are produced by following the procedures described above are substantially identical in construction with the TFT's 4 which are formed one each at the points of intersection between the address wires 2 and the data wires 3, the formation of the TFT's 11 and 12 and that of the TFT'S 4 can be simultaneously carried out and, as a result, the process of production can be simplified.

In the active matrix substrate of this invention, as the film of the first wiring material, films formed of Mo, Ta, TaN, Cr, Ni, Al, Al-Si-Cu, W, ITO, and Cu, and alloys having these metals as main components thereof or laminates formed of such metals and alloys by the spattering process or vacuum deposition process are usable in addition to the MoTa film formed by the spattering process.

As the gate-insulating film 16, the anodic oxide film of the first wiring material mentioned above, films formed of $SiO_X$, $SiN_X$, and $TaO_X$ by the spattering process, film of laminates formed of $SiN_X$ by the plasma CVD process are usable in addition to the $SiO_X$ film formed by the plasma CVD process.

Further, as the film of the second wiring material, films formed of Mo, Al, Cr, Cu, Ti, Ta, TaN, Al-Si-Cu, W, and ITO and alloys having these metals as main components thereof and laminates formed of such metals and alloys by the spattering process or vacuum deposition process are usable in addition to the laminates formed of Cr and Al by the spattering process.

As the channel-protecting film 18, films formed of $SiO_X$ and $SiN_X$ by the spattering process, films formed of $SiO_X$ and $SiN_X$ or laminates of such films by the plasma CVD process are usable in addition to the $SiN_X$ film formed by the plasma CVD process.

As the protective insulating film 19, films formed of $SiO_X$ and $SiN_X$ by the spattering process and films or laminates formed of $SiO_X$ and $SiN_X$ by the plasma CVD process are usable in addition to the $SiN_X$ film formed by the plasma CVD process.

The TFT's of which the resistors 10 are composed may be so constructed that the resistors 10 may be formed independently in the channel parts of the TFT's without incorporating therein any channel-protecting film. They may be otherwise in the top-gate pattern or coplanar pattern. Optionally, p-Si may be used in the place of a-Si.

Now, the second embodiment of this invention will be described below with reference to FIG. 6.

Unlike the first embodiment in which the short-circuiting wire 13 is formed in the shape of a ladder along the periphery on the insulating substrate 1, the liquid crystal display device illustrated in this diagram has the short-circuiting wire 13 formed in the shape of a comb provided in the interior thereof with a bus bar. In other respects, the short-circuiting wire 13 is identical in construction with that of the first embodiment and can be produced by the same method as used in the first embodiment.

Figure 7:
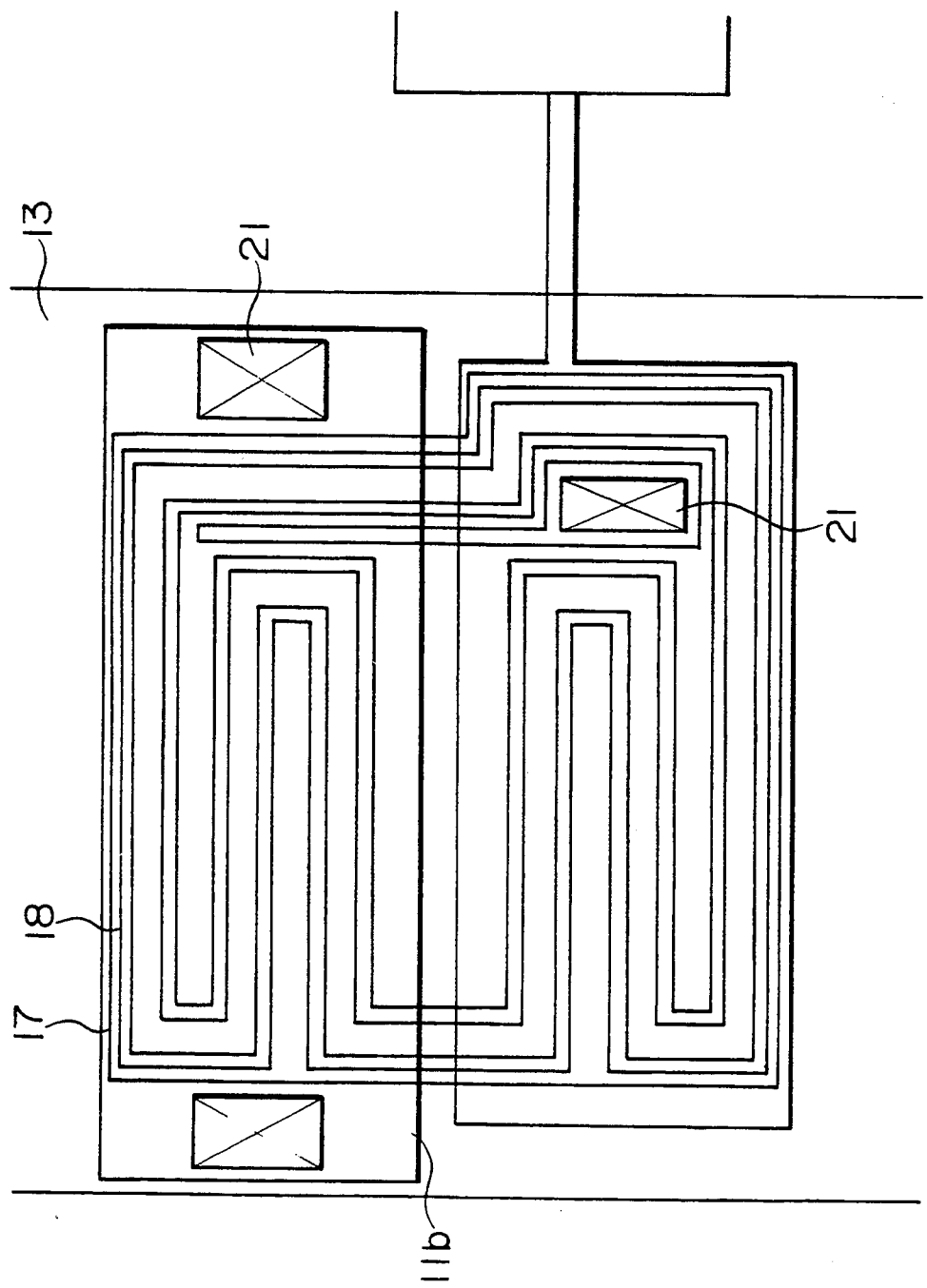
FIG. 7 is a plan view of a TFT resistance part of the third embodiment of this invention.

Now, the third embodiment of this invention will be described below with reference to FIG. 7.

In the liquid crystal display device illustrated in this diagram, when the resistors are to be formed with the TFT's 11 and 12 requiring a large channel width because of the width of the short-circuiting wire 13, the source electrodes 11c and 12c and drain electrodes 11b and 12b of the TFT's 11 and 12 forming the resistors 10 are formed in the shape of a comb. In other words, the liquid crystal display device is identical in construction to that of the first embodiment and can be produced by the same method. Optionally, this embodiment can be applied to the second embodiment.

Now, the fourth embodiment of this invention will be described below.

Figure 8:
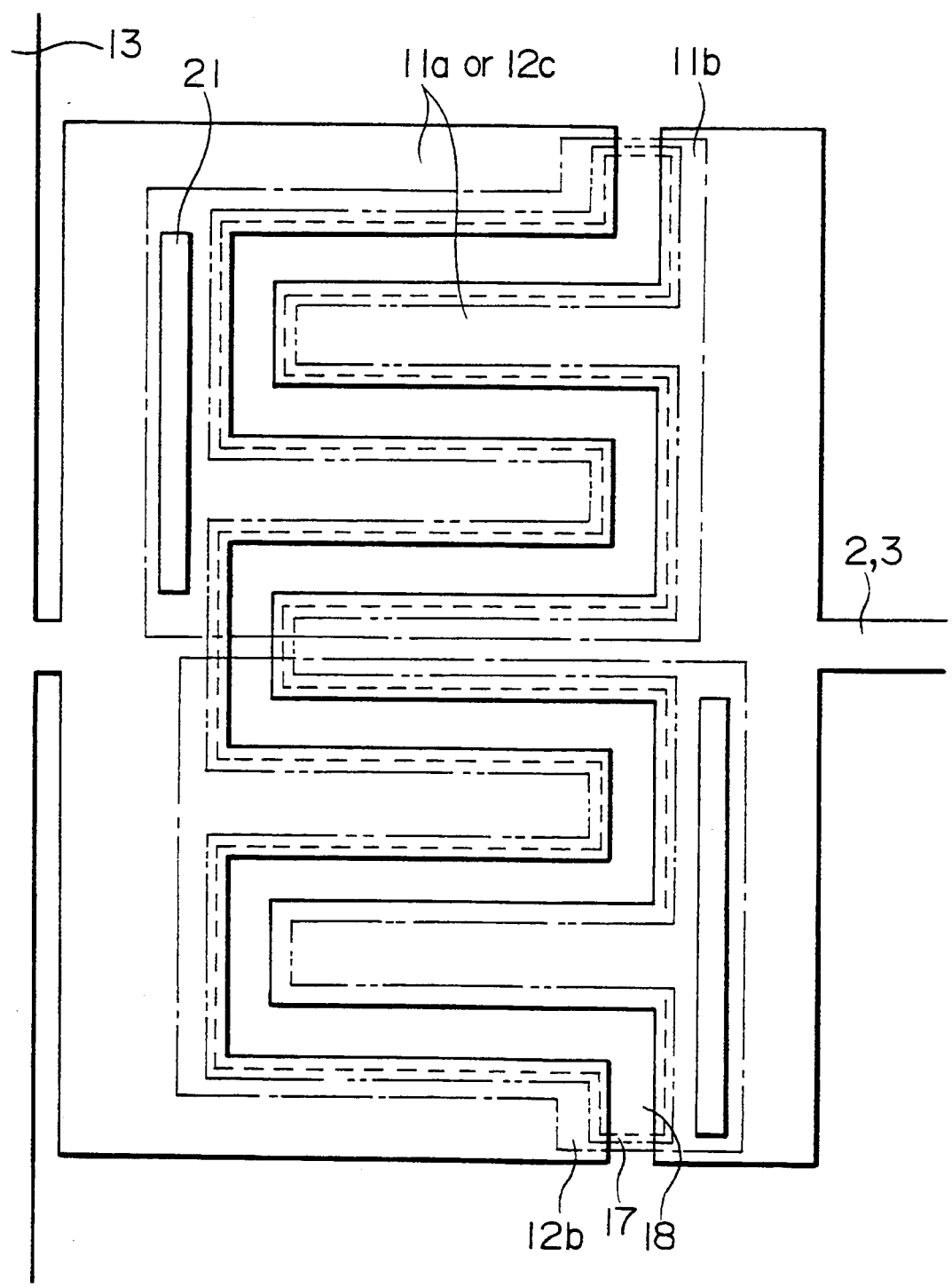
FIG. 8 is a plan view of a TFT resistance part of the fourth embodiment of this invention.
Figure 9:
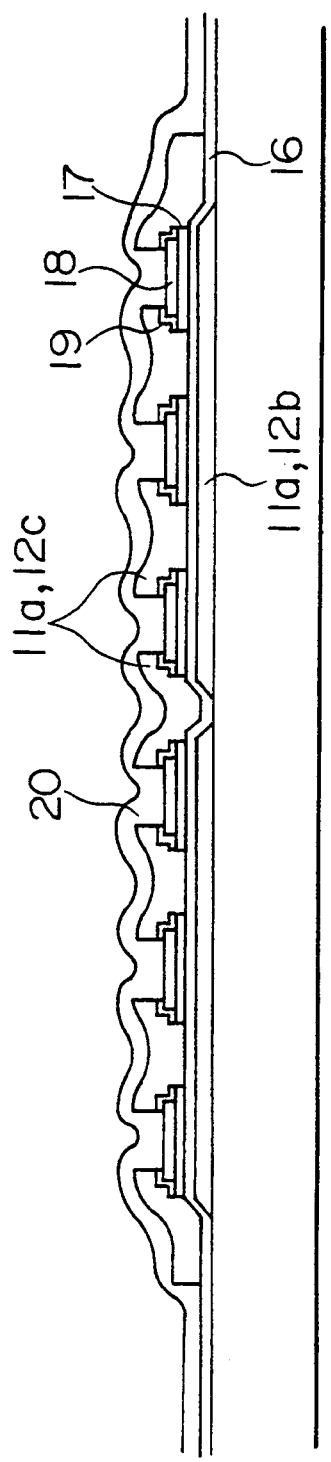
FIG. 9 is a longitudinally sectioned front view of the TFT resistance part of the fourth embodiment of this invention.

Though the equivalent circuit of the liquid crystal device of this embodiment is identical to that illustrated in FIG. 1, with the exception that the two devices are different in the construction of the resistors 10. A magnified diagram of one resistor 10 is shown in FIG. 8 and a magnified cross section taken through FIG. 8 along the line a—a' is shown in FIG. 9.

In the liquid crystal display device illustrated in these diagrams, the resistor 10 is formed between the driving pulse input pads 8 and 9 and the short-circuiting wire 13, the source electrodes 11c and 12c and drain electrodes 11a and 12a forming the resistor 10 are formed in the shape of a comb, and the channel parts of the TFT's 11 and 12 forming the resistor 10 are zigzagged.

Figure 10:
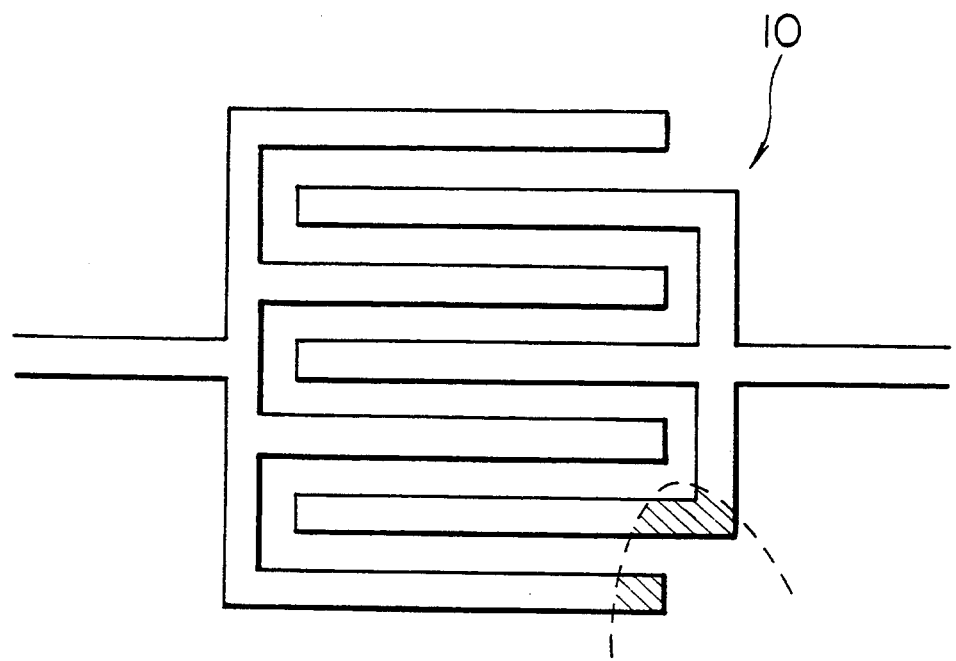
FIG. 10(a) and 10(b) are diagrams for aiding in the explanation of the effect of the fourth embodiment of this invention.
Figure 10:
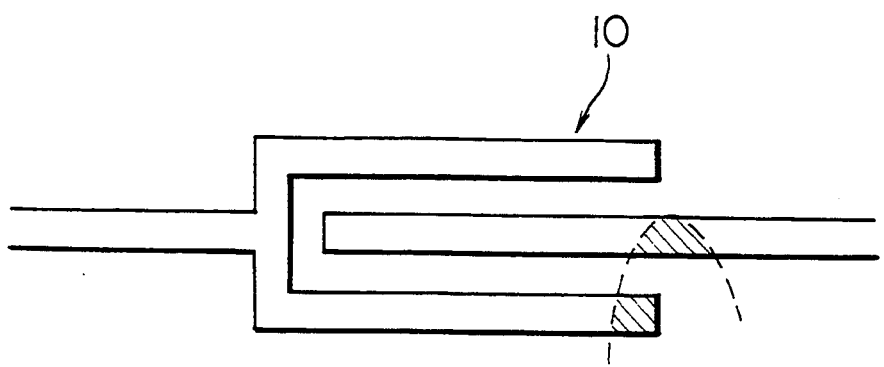

In this liquid crystal display device, since the source electrodes 11c and 12c and drain electrodes 11a and 12a of the TFT's 11 and 12 forming the resistor 10 are formed in the shape of a comb as illustrated in FIG. 10(a), the device is less susceptible in the disconnection of circuit due to electrostatic damage (as indicated with a hatching in the diagram) than when the source electrodes 11c and 12c and drain electrodes 11a and 12a are formed as illustrated in FIG. 10(b).

Figure 11:
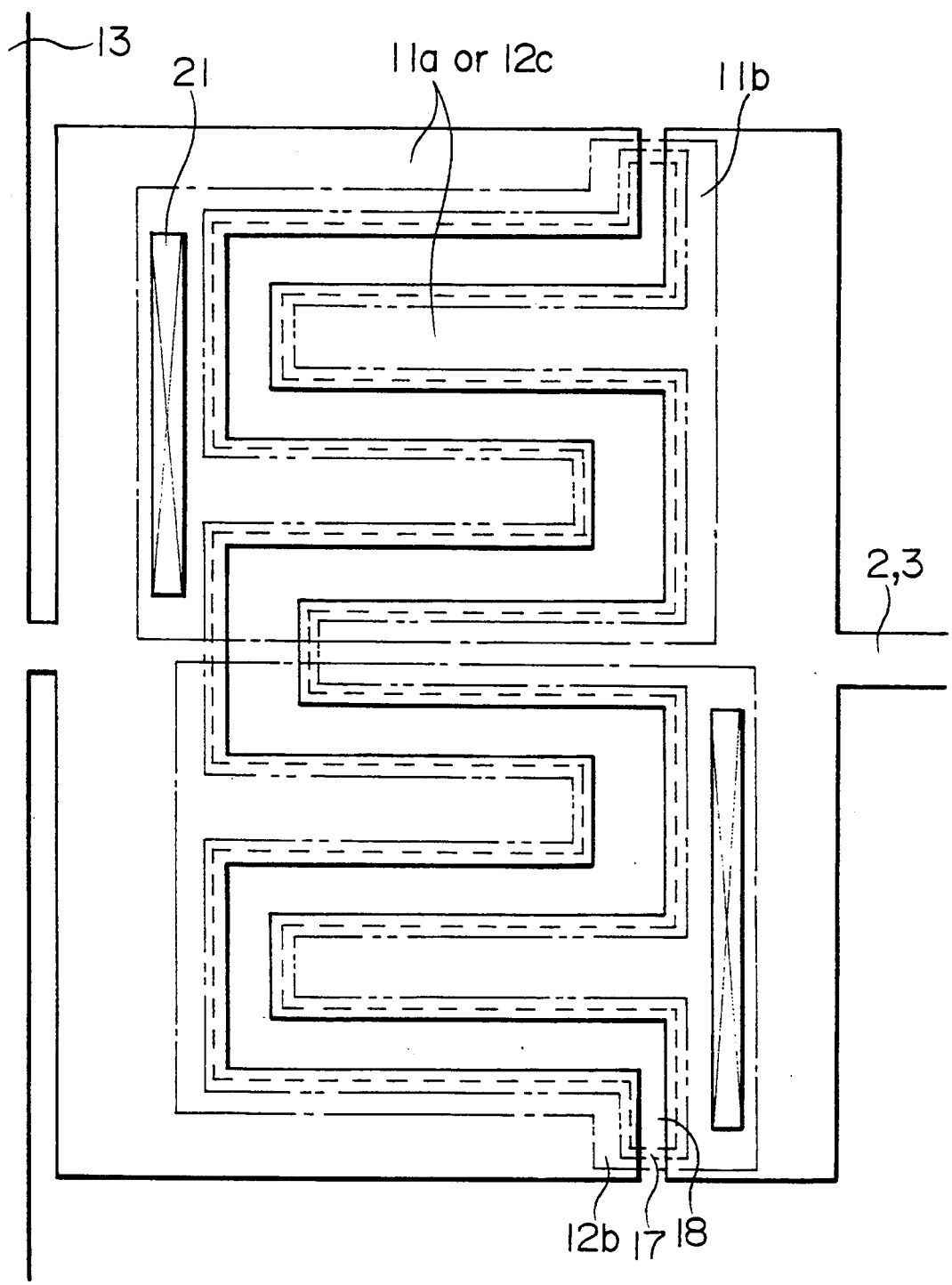
FIG. 11 is a plan view of a TFT resistance part of the fifth embodiment of this invention.

Now, the fifth embodiment of this invention will be described below with reference to FIG. 11.

The liquid crystal display device illustrated in this diagram is identical with that of the fourth embodiment in respect that the source electrodes 11c and 12c and drain electrodes 11a and 12a forming the resistor 10 are formed in the shape of a comb and different therefrom in respect that the electrode fingers of the comb-shaped source electrodes 11c and 12c and drain electrodes 11a and 12a are increasingly long on the outer sides and the intervals between the opposed electrodes are increasingly narrow on the outer sides.

The liquid crystal display device of this embodiment, owing to the construction described above, is liable to sustain damage more readily in the parts of a smaller channel length, namely in the electrode fingers on the outer sides, when the resistors 10 are exposed to static electricity of large intensity. The central parts of the source electrodes 11c and 12c and drain electrodes 11a and 12a which form the sites of union between the address wires 2 and data wires 3 on the one part and the short-circuiting wire 13, therefore, are less susceptible of damage by static electricity and consequently less susceptible of disconnection of circuit.

Figure 12:
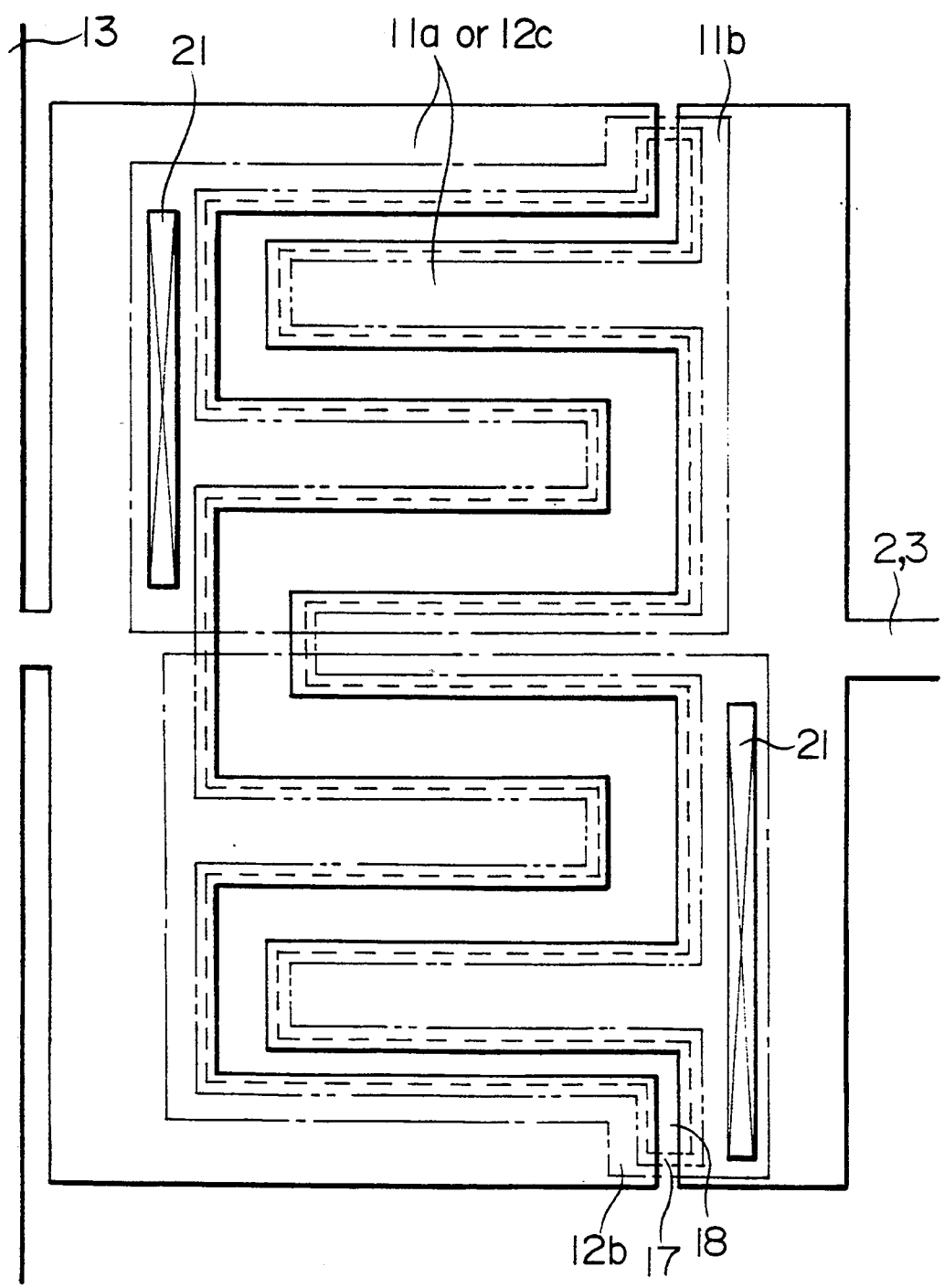
FIG. 12 is a plan view of a TFT resistance part of the sixth embodiment of this invention.

Now, the sixth embodiment of this invention will be described below with reference to FIG. 12.

The liquid crystal display device illustrated in this diagram is identical to that of the fourth embodiment in respect that the source electrodes 11c and 12c and drain electrodes 11a and 12a of the TFT's 11 and 12 forming the resistor 10 are formed in the shape of a comb and different therefrom in respect that the intervals between the intersecting electrode fingers of the comb-shaped source electrodes 11c and 12c and drain electrodes 11a and 12a are increasingly small on the outer sides.

In the liquid crystal display device of this embodiment, like that of the fifth embodiment, the central parts of the source electrodes 11c and 12c and drain electrodes 11a and 12a are susceptible only sparingly to damage by static electricity and consequently susceptible only sparingly to disconnection of circuit.

Figure 13:
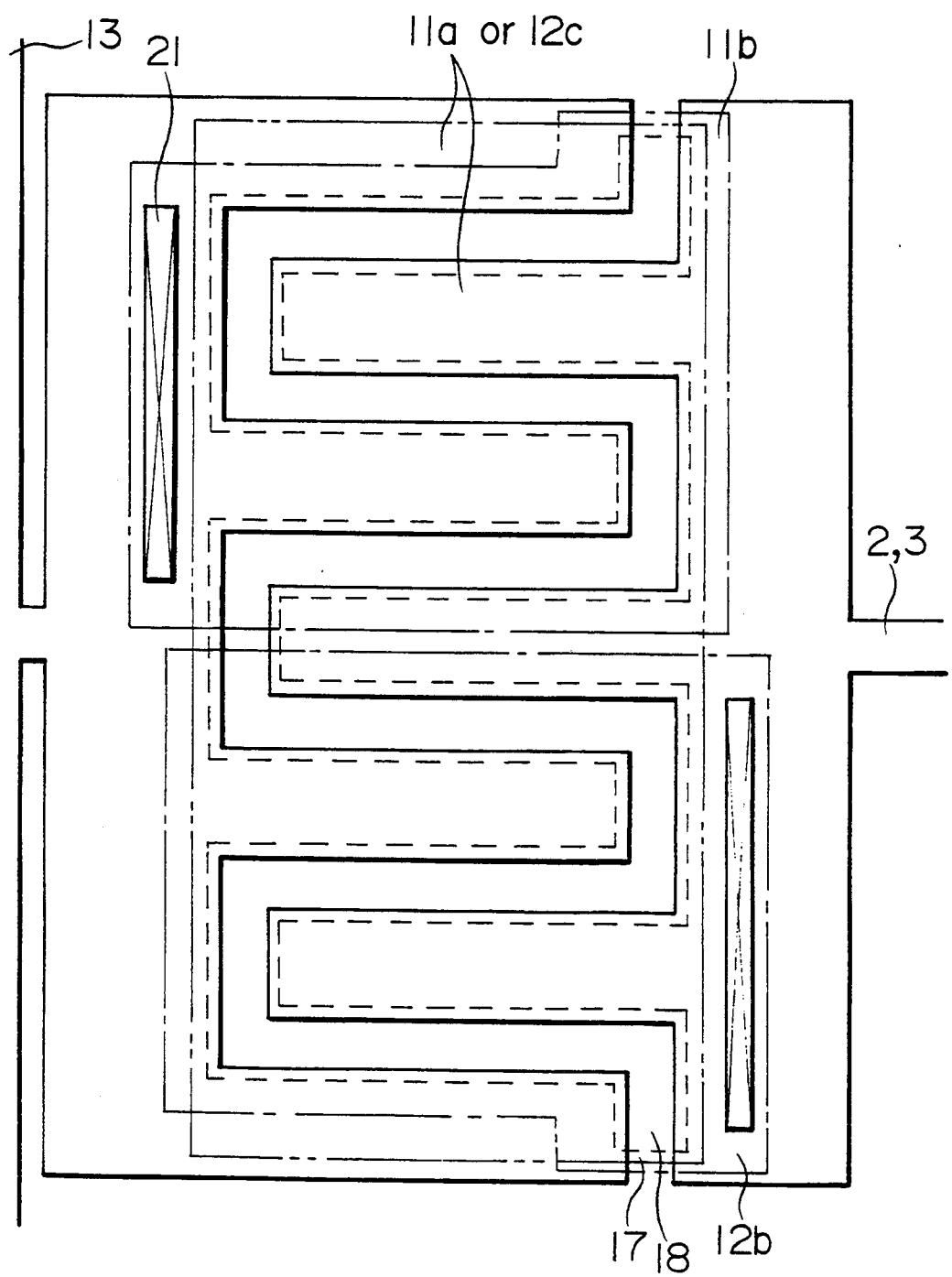
FIG. 13 is a plan view of a TFT resistance part of the seventh embodiment of this invention.

Now, the seventh embodiment of this invention will be described below with reference to FIG. 13.

The liquid crystal display device illustrated in this diagram has the a-Si part 17 thereof formed in a nearly rectangular shape so as to cover wholly the resistance part of the TFT's 11 and 12, whereas those of the fourth to sixth embodiments have the a-Si films 17 and channel-protecting films 18 of the TFT's 11 and 12 forming the resistors 10 formed in a zigzagging pattern like the channel parts.

The liquid crystal device of this embodiment, owing to the construction described above, needs not form the a-Si parts 17 in a finely shaped pattern and, therefore, is allowed to form the resistors 10 with TFT'S of a large W/L (width to length) ratio within the same region.

Optionally, the construction of the fifth or sixth embodiment described above may be applied to the liquid crystal display device as constructed in this embodiment.

Now, the eighth embodiment of this invention will be described below.

Figure 14:
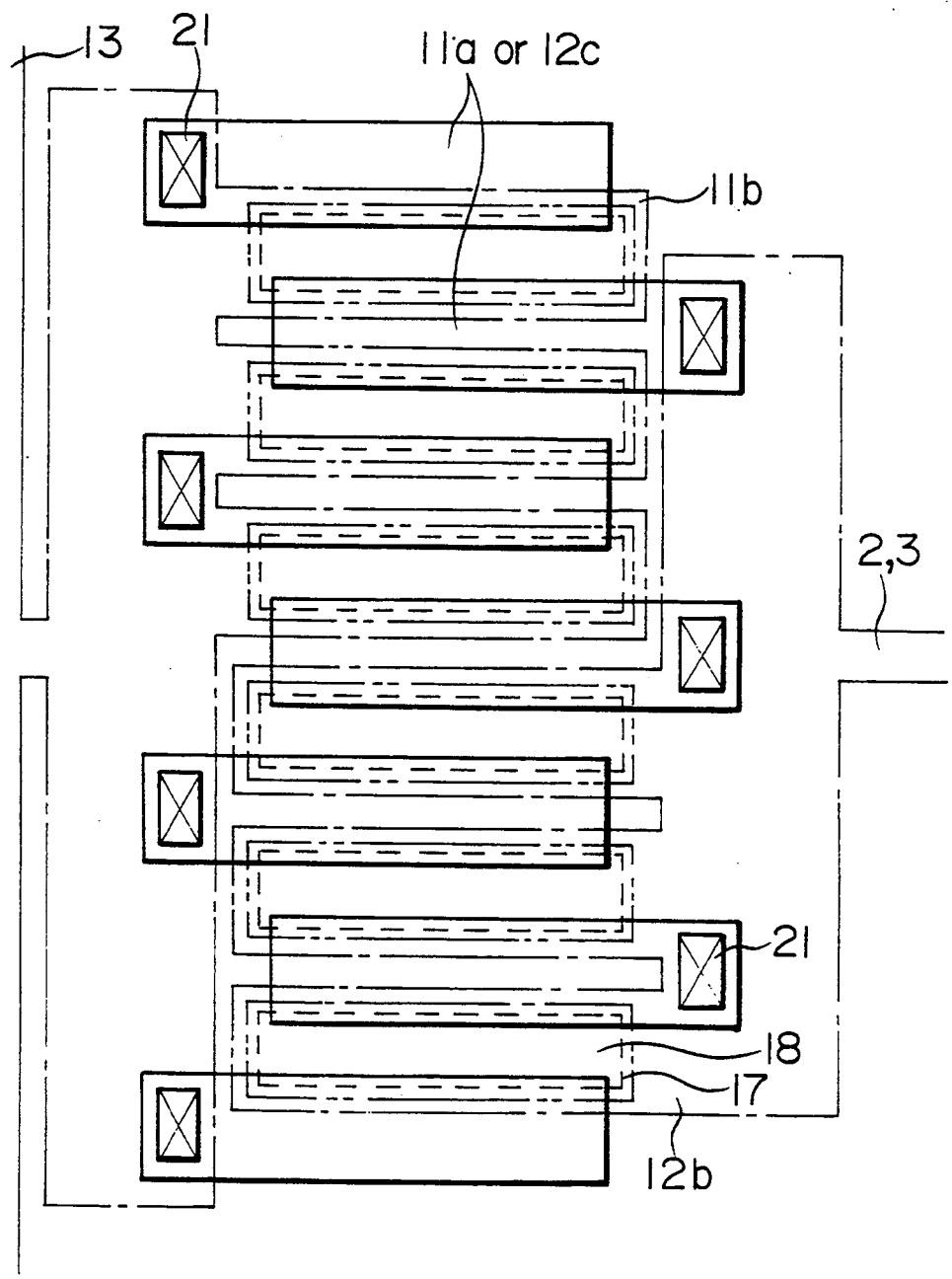
FIG. 14 is a plan view of a TFT resistance part of the eighth embodiment of this invention.
Figure 15:
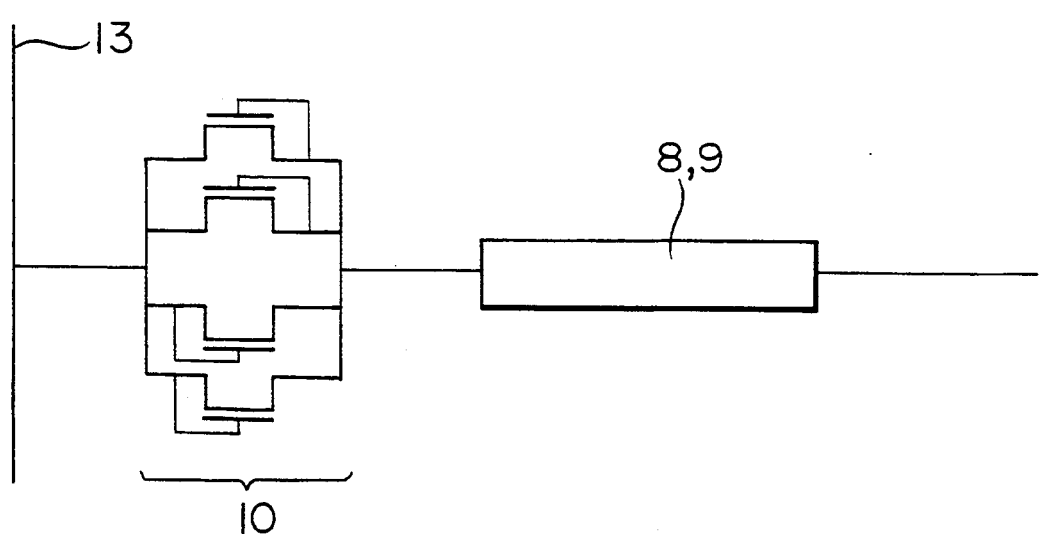
FIG. 15 is an equivalent circuit diagram of the TFT resistance part of the eighth embodiment of this invention.

FIG. 14 is a plan view of the resistor 10 formed of TFT's in this embodiment and FIG. 15 is an equivalent circuit diagram between the driving pulse input pads 8 and 9 and the short-circuiting wire 13.

The liquid crystal display device illustrated in these diagrams is identical to that of the fourth embodiment in respect that the source electrodes 11c and 12c and drain electrodes 11a and 12a of the TFT's 11 and 12 forming the resistor 10 are formed in the shape of a comb and different therefrom in respect that the electrode fingers of the source electrodes 11c and 12c and drain electrodes 11a and 12a are electrically connected to the bus bar formed in the lower layer severally through the medium of separate through holes 21. To be specific, the TFT 11 and 12 are each formed of two TFT elements as illustrated in the equivalent circuit diagram of FIG. 15.

In the liquid crystal display device of this embodiment, owing to the construction described above, the resistance part continues to fulfill the part thereof infallibly even when one of these TFT elements is broken by static electricity.

Figure 16:
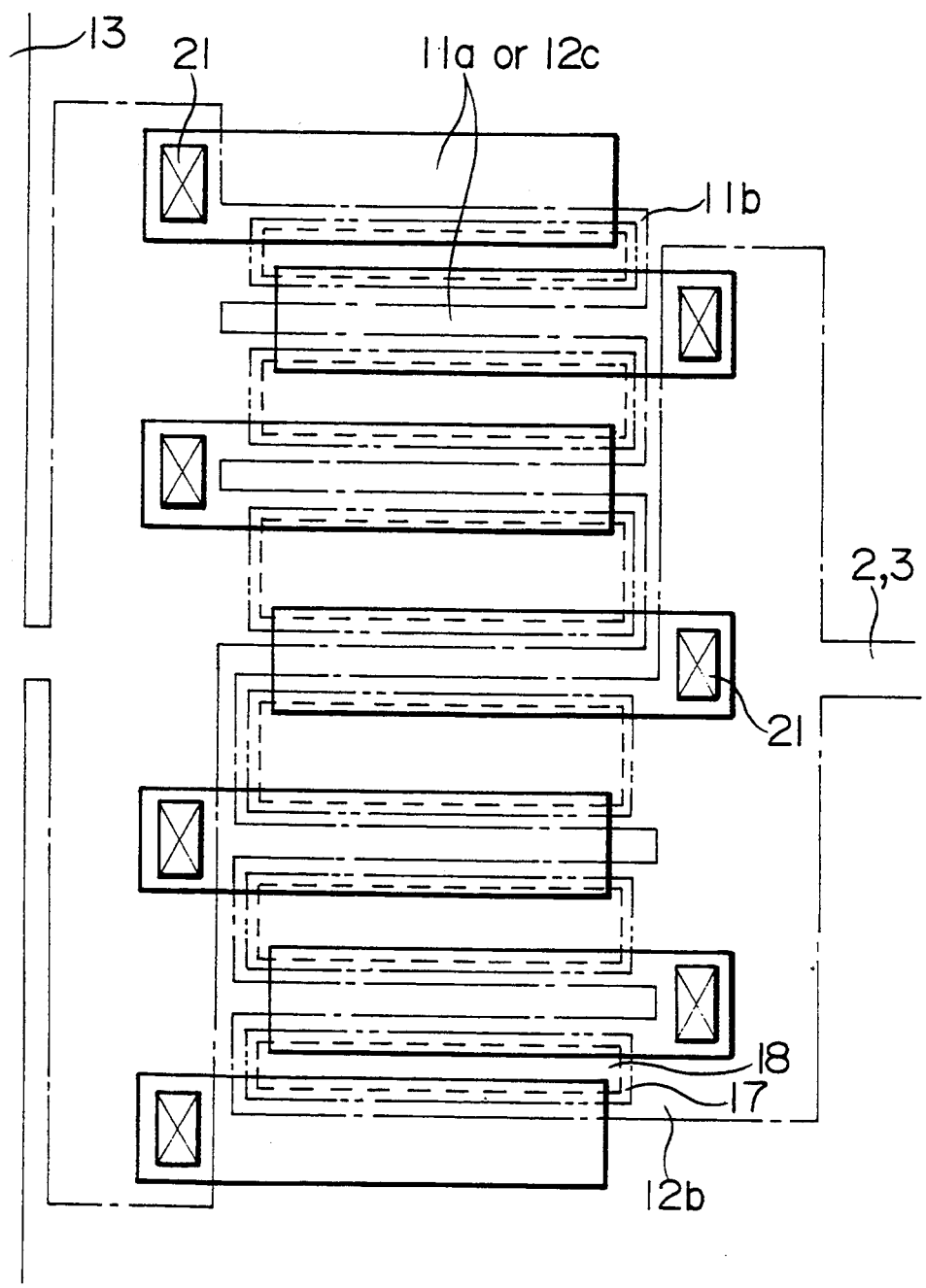
FIG. 16 is a plan view of a TFT resistance part of the ninth embodiment of this invention.

Now, the ninth embodiment of this invention will be described below with reference to FIG. 16.

The liquid crystal display device illustrated in this diagram is identical to that of the eighth embodiment in respect that the electrode fingers of the source electrodes 11c and 12c and drain electrodes 11a and 12a are electrically connected to the bus bar formed in the lower layer severally through the medium of separate through holes 21 and different therefrom in respect that the intervals between the intersecting electrode fingers of the source electrodes 11c and 12c and drain electrodes 11a and 12a are increasingly narrow on the outer sides.

Figure 17:
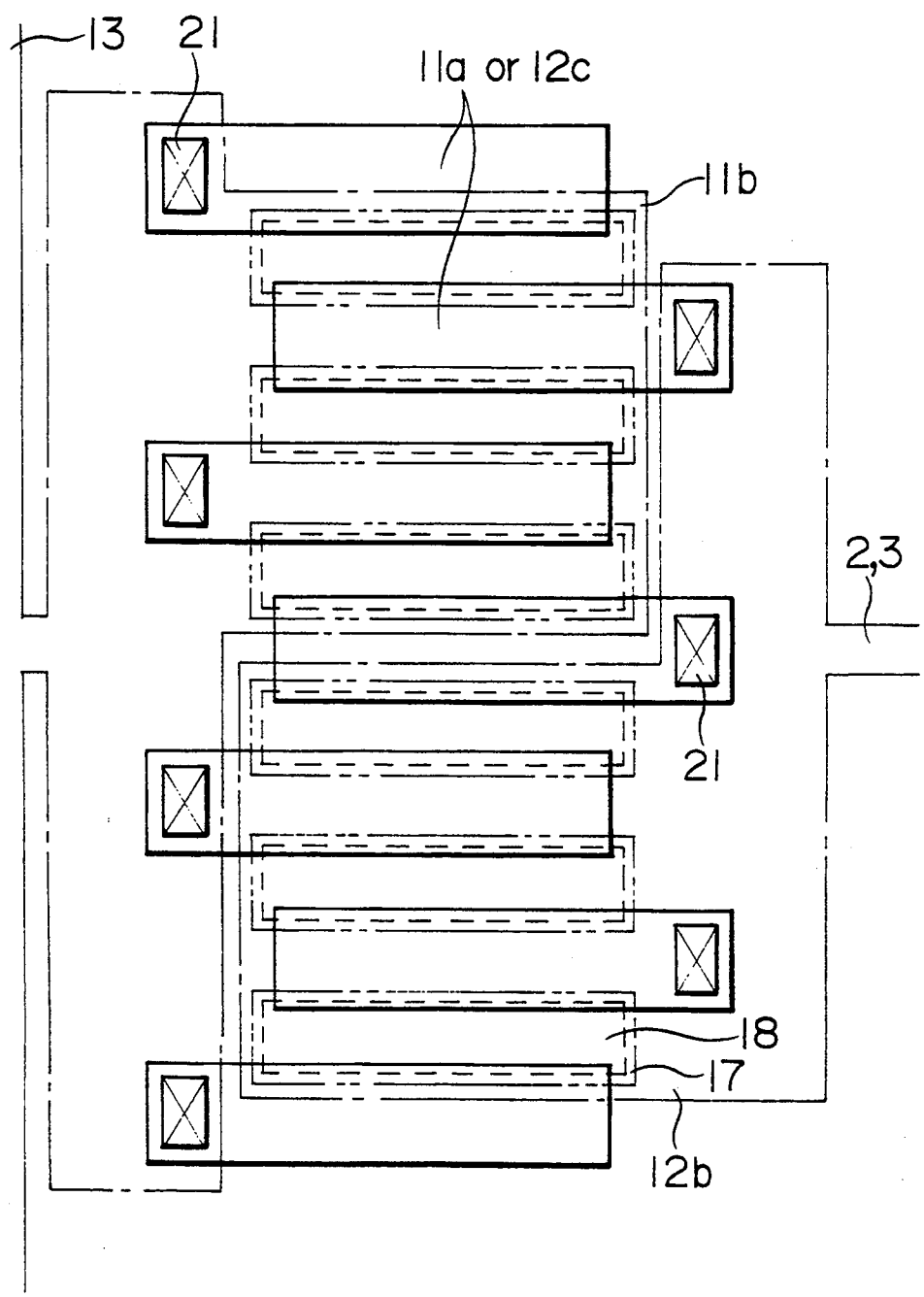
FIG. 17 is a plan view of a TFT resistance part of the tenth embodiment of this invention.

Now, the tenth embodiment of this invention will be described below with reference to FIG. 17.

The liquid crystal display device illustrated in this diagram is identical to that of the eighth embodiment in respect that the electrode fingers of the source electrodes 11c and 12c and drain electrodes 11a and 12a are electrically connected to the bus bar formed in the lower layer severally through the medium of separate through holes 21 and different therefrom in respect that the gate electrodes 11b and 12b are formed not in the shape of a comb but in a square shape and the one-piece square-shaped gate electrodes 11b and 12b severally cover the component electrode fingers of the source electrodes 11c and 12c and drain electrodes 11a and 12a.

Optionally, the construction of the fifth or seventh embodiment described above may be applied to the liquid crystal display device of the construction of this embodiment.

Figure 18:
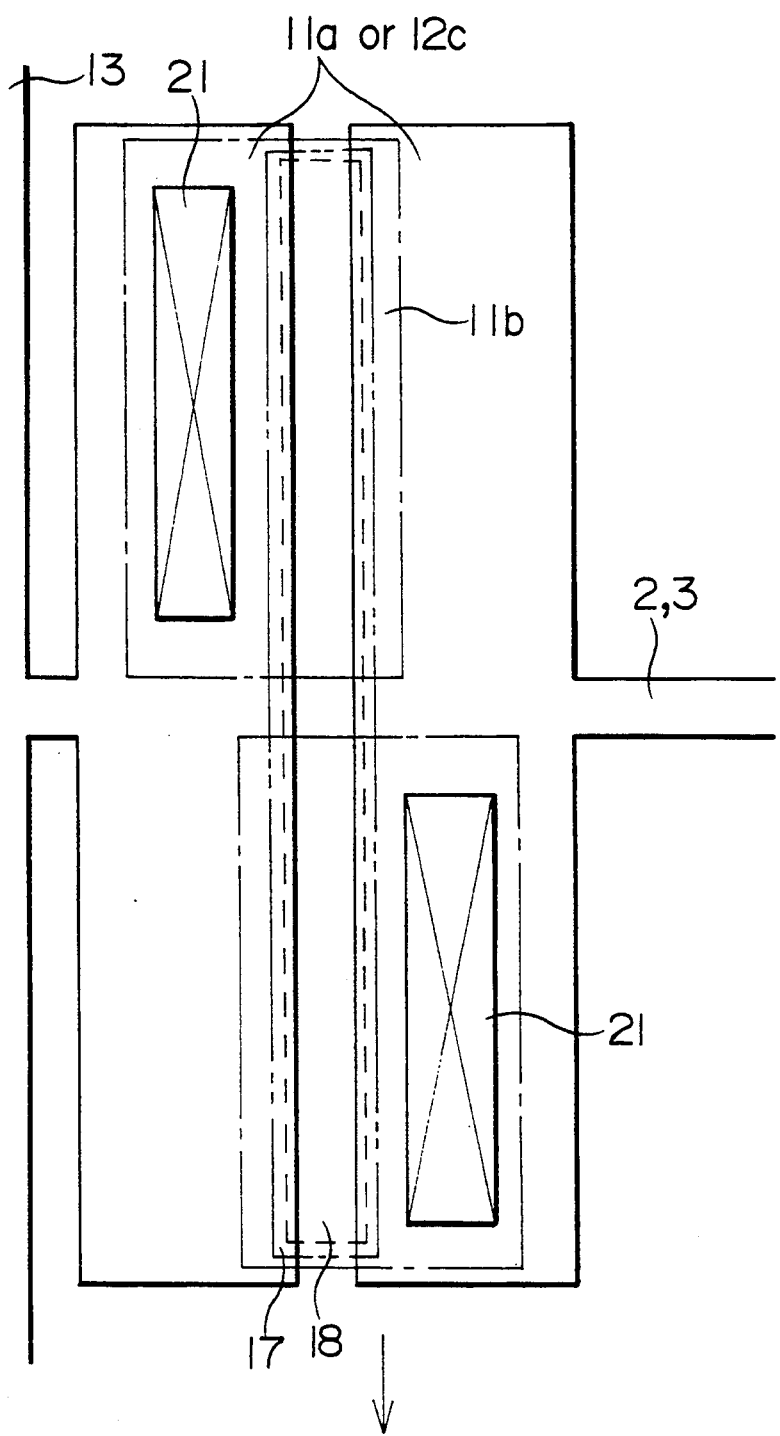
FIG. 18 is a plan view of a TFT resistance part of the 11th embodiment of this invention.

Now, the 11th embodiment of this invention will be described below with reference to FIG. 18.

In the liquid crystal display device illustrated in this diagram, the channel parts of the TFT's 11 and 12 forming the resistor 10 are formed in directions perpendicular to the address wires 2 and data wires 3 and the source electrodes 11c and 12c and the drain electrodes 11a and 12a are opposed across a linear interval.

Figure 19:
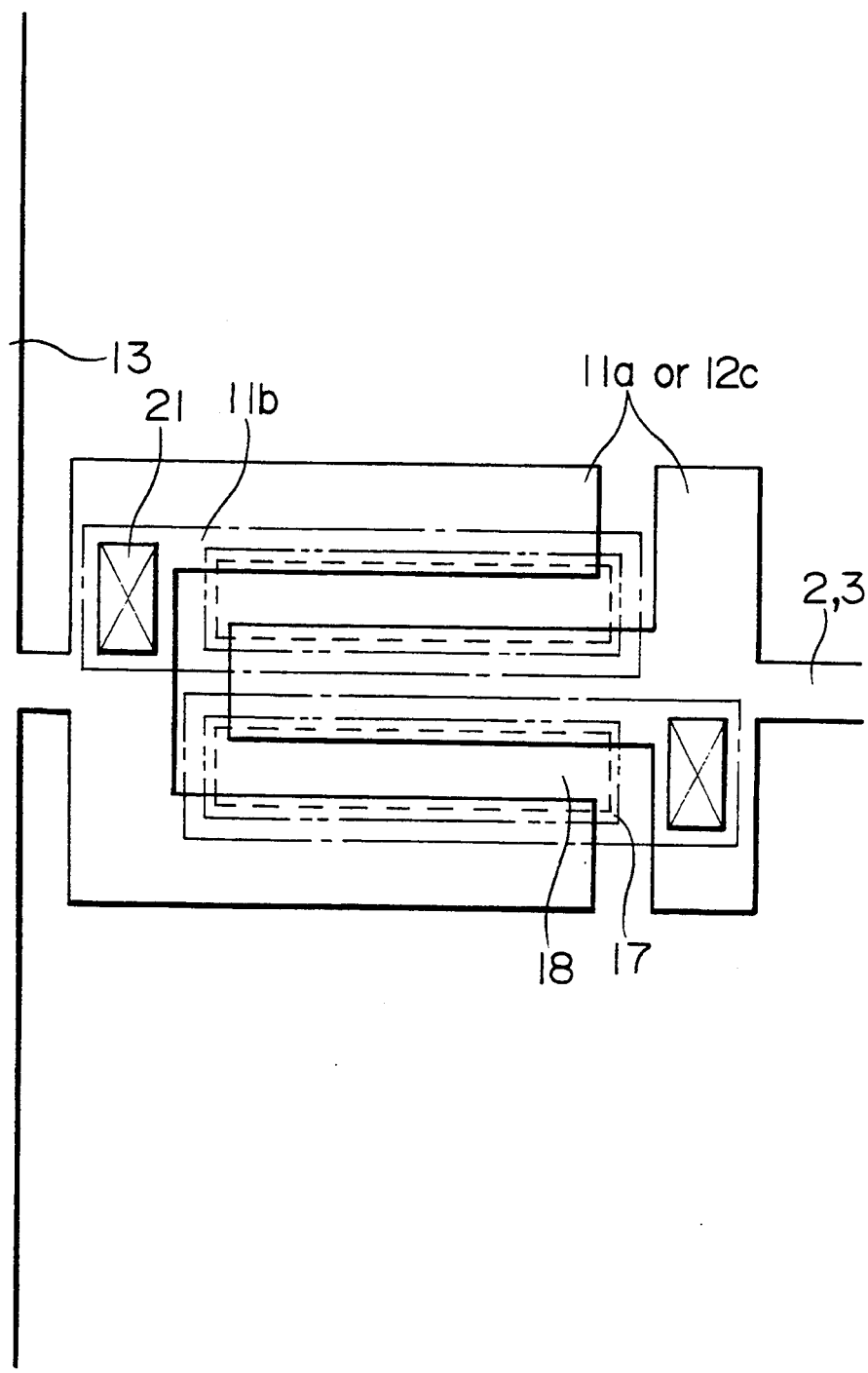
FIG. 19 is a diagram for aiding in the explanation of the effect of the 11th embodiment of this invention.

The liquid crystal display device of this embodiment, owing to the construction described above, hardly encounters perfect disruption of resistance and continues to fulfill the function of resistance infallibly even when any of the electrodes sustain damage caused by static electricity as compared with the construction in which the channel parts of the TFT's 11 and 12 are formed in directions parallel to the address wires 2 and data wires 3 as illustrated in FIG. 19.

Figure 20:
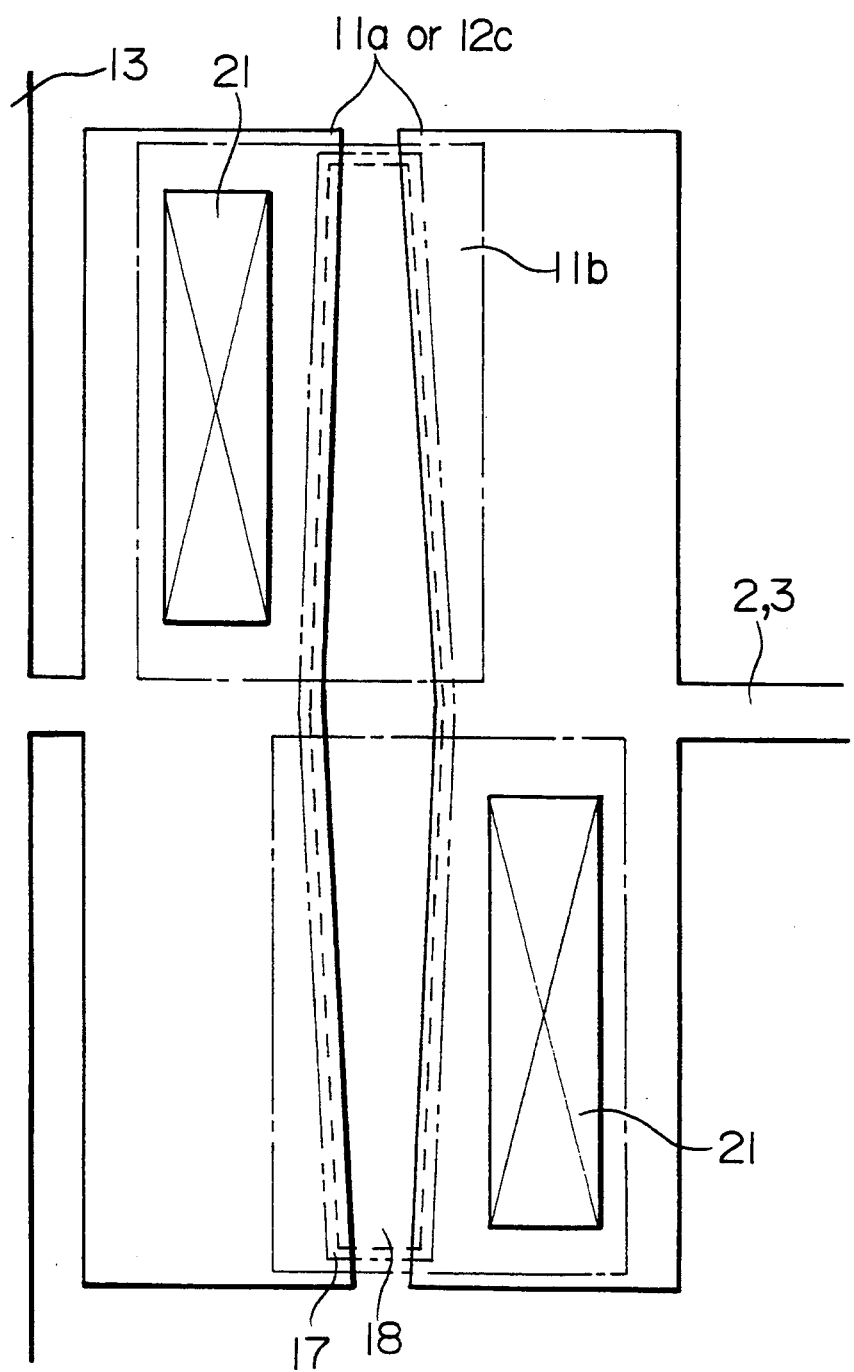
FIG. 20 is a plan view of a TFT resistance part of the 12th embodiment of this invention.

Now, the 12th embodiment of this invention will be described below with reference to FIG. 20.

The liquid crystal display device illustrated in this diagram is identical to the liquid crystal display device of the first embodiment in respect that the channel parts of the TFT's 11 and 12 forming the resistor 10 are formed in directions perpendicular to the address wires 2 and data wires 3 and different therefrom in respect that the intervals between the opposed source electrodes 11c and 12c and drain electrodes 11a and 12a are increasingly narrow on the outer sides.

In the liquid crystal display device of this embodiment, the central parts of the source electrodes 11c and 12c and drain electrodes 11a and 12a are susceptible only sparingly to damage caused by static electricity and consequently susceptible only sparingly to disconnection of circuit.

Figure 21:
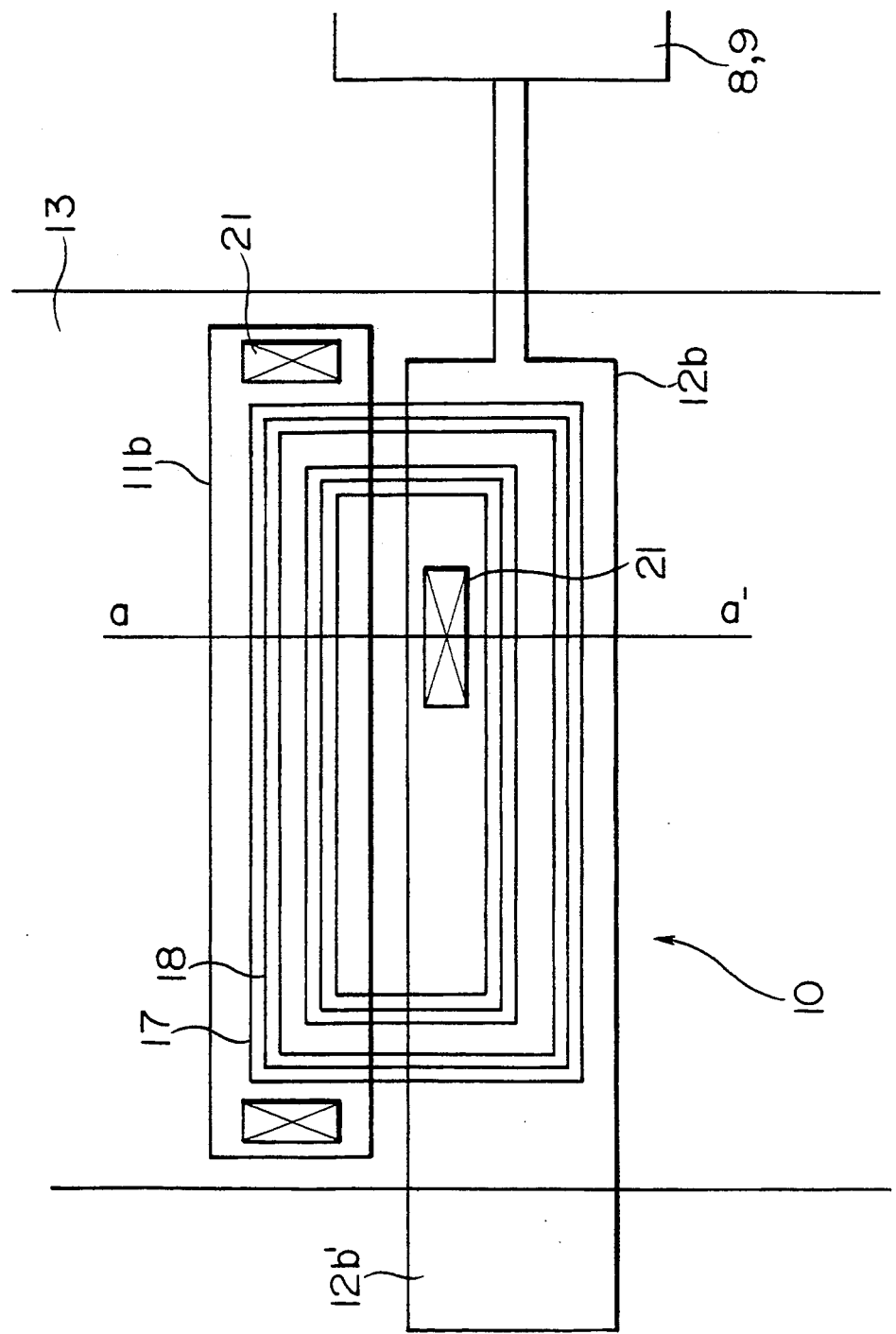
FIG. 21 is a plan view of a TFT resistance part of the 13th embodiment of this invention.

Now, the 13th embodiment of this invention will be described below with reference to FIG. 21.

The liquid crystal display device illustrated in this diagram is identical in construction to that of the first embodiment illustrated in FIG. 2 in respect that the resistors 10 are formed in the region falling in the central part of the short-circuiting wire 13 and different therefrom in respect that the leading terminal 12b' of the gate electrode 12b connected to the driving pulse input pads 8 and 9 in the gate electrodes of the TFT's 11 and 12 forming the resistor 10 are protruded from the short-circuiting wire 13.

In the liquid crystal display device of this embodiment, since the leading terminals 12b' of the gate electrodes 12b are protruded from the short-circuiting wire 13, the possibility that the address wires 2 and data wires 3 leading to the gate electrodes 12b will be short-circuited to the short-circuiting wire 13 when the application of static electricity of high voltage inflicts local damage upon the leading terminals 12b' of the gate electrodes 12b is nil.

Figure 22:
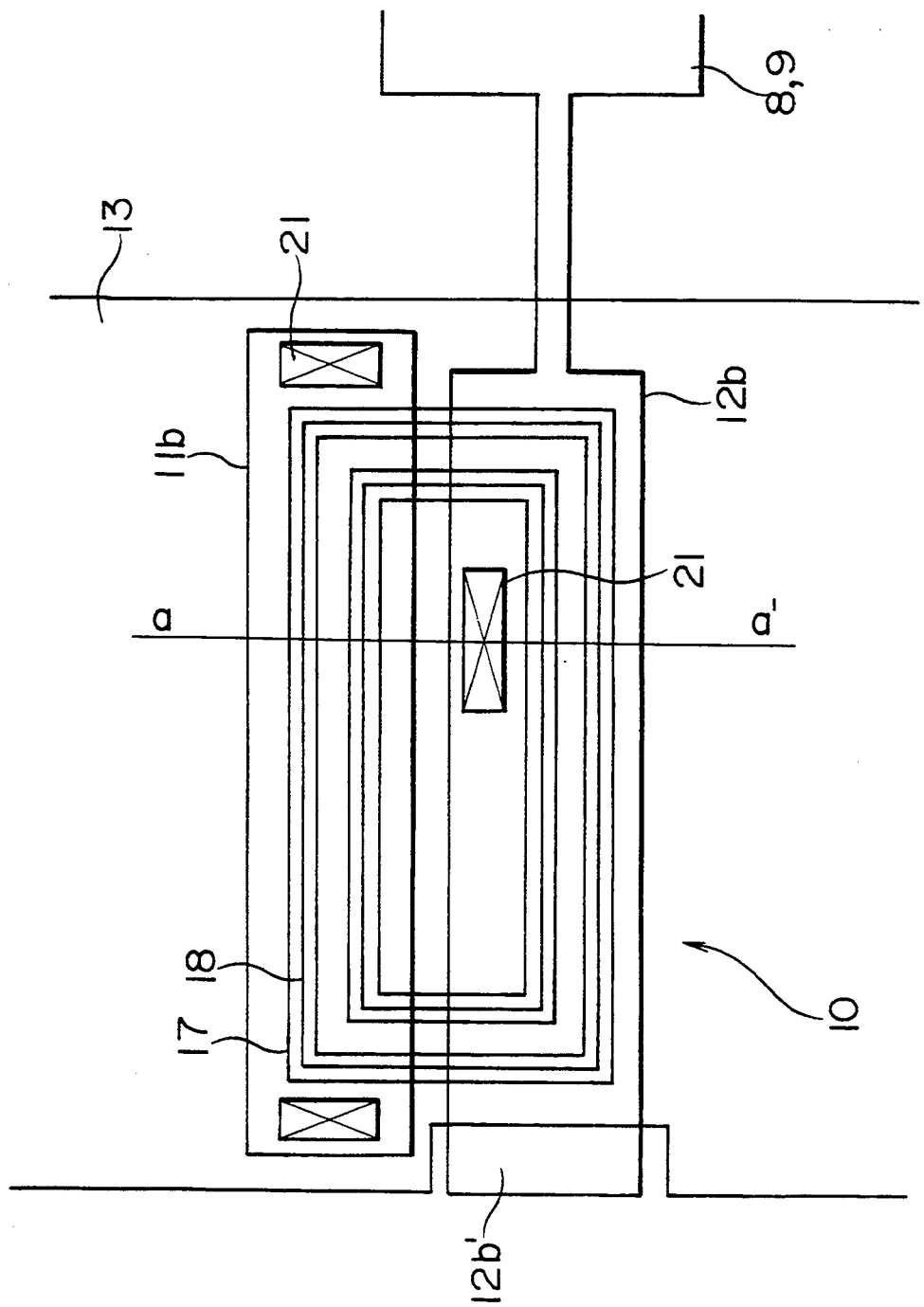
FIG. 22 is a plan view of a TFT resistance part of the 14th embodiment of this invention.

Now, the 14th embodiment of this invention will be described below with reference to FIG. 22.

In the liquid crystal display device illustrated in this diagram, since the part of the short-circuiting wire 12 falling near the leading terminal 12b' of the particular gate electrode 12b connected to the driving pulse input pads 8 and 9 in all the gate electrodes of the TFT's 11 and 12 forming the resistor 10 is formed in an inwardly depressed shape, the leading terminal 12b' of the gate electrode 12b is caused to protrude from the short-circuiting wire 13. The liquid crystal display device of this embodiment fulfills the same effect as that of the 13th embodiment.

Figure 23:
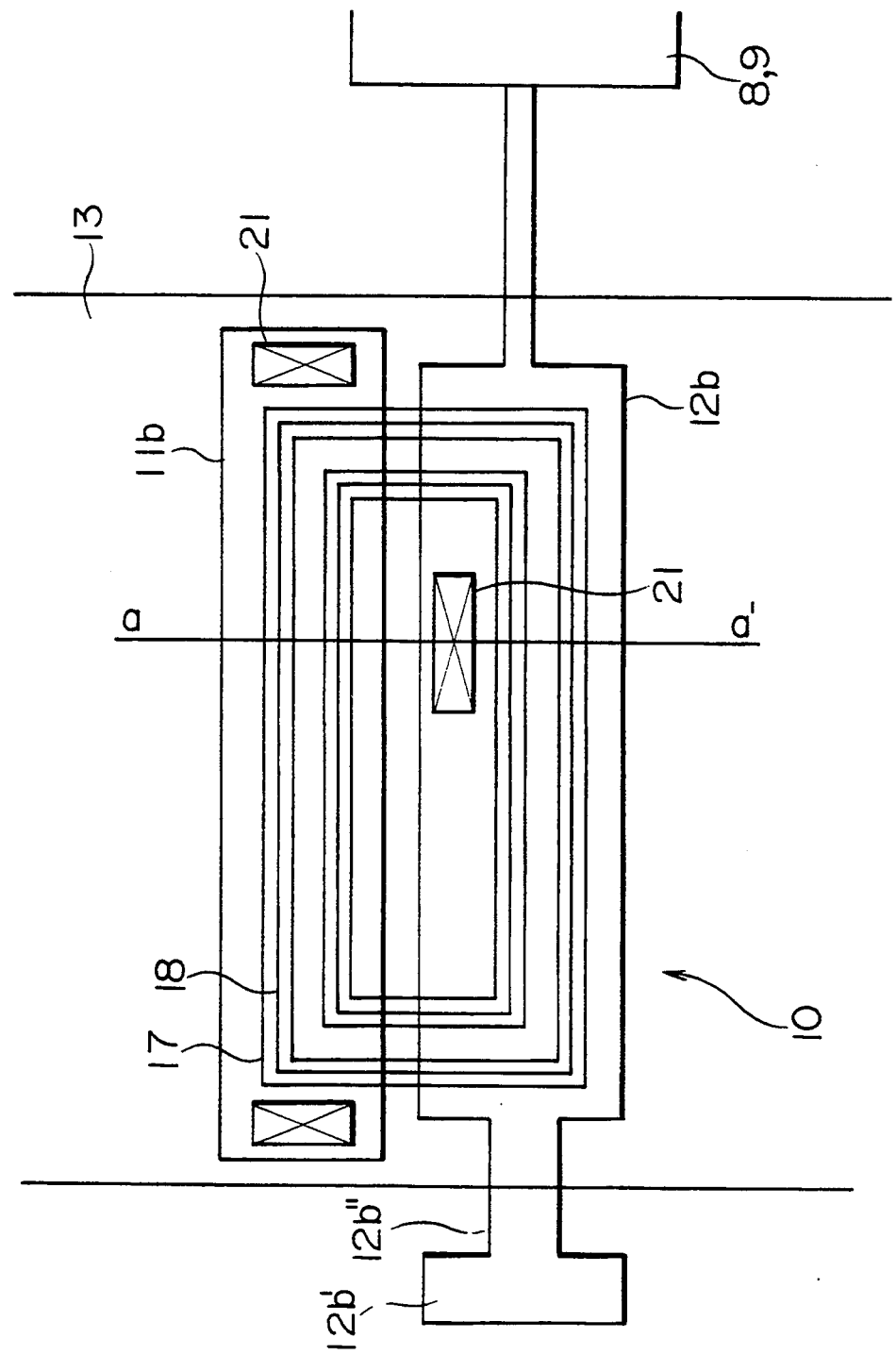
FIG. 23 is a plan view of a TFT resistance part of the 15th embodiment of this invention.

Now, the 15th embodiment of this invention will be described below with reference to FIG. 23.

The liquid crystal display device illustrated in this diagram is identical in construction to that of the 13th embodiment in respect that the leading terminal 12b' of the gate electrode 12b connected to the driving pulse input pads 8 and 9 in all the gate electrodes of the TFT's 11 and 12 forming the resistors 10 is protruded from the short-circuiting wire 13 and different therefrom in respect that the gate electrode 12b has a constriction 12b' near the leading terminal 12b".

Since the liquid crystal display device of this embodiment is constructed so as to incorporate therein the constriction 12b", the local damage by static electricity is more liable to occur at the leading terminal 12" and the possibility that the address wires 2 and data wires 3 leading to the gate electrode 12b will be short-circuited to the short-circuiting wire 13 is further lessened.

Figure 24:
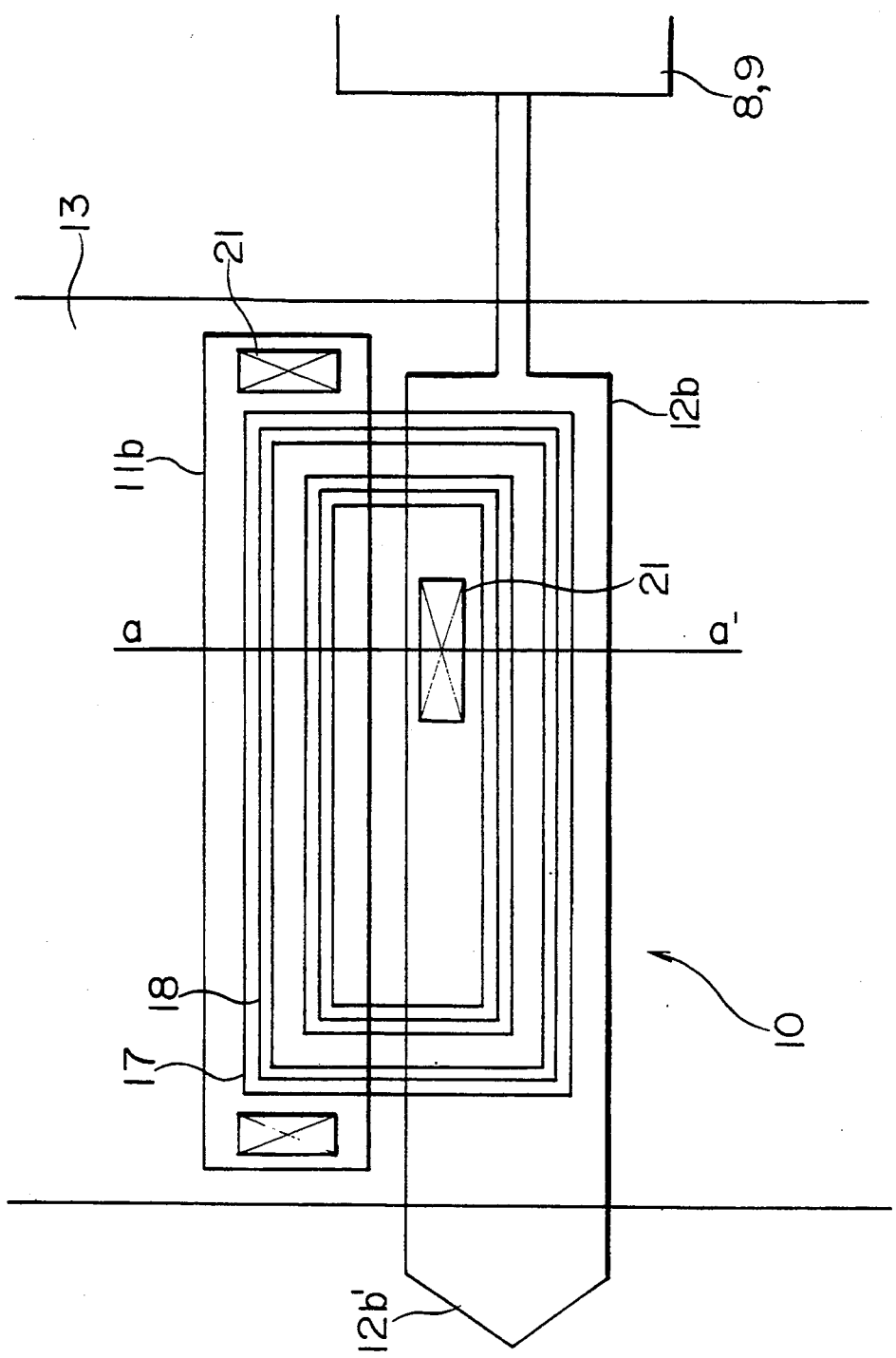
FIG. 24 is a plan view of a TFT resistance part of the 16th embodiment of this invention.

Now, the 16th embodiment of this invention will be described below with reference to FIG. 24.

The liquid crystal display device illustrated in this diagram is identical in construction to that of the 13th embodiment in respect that the leading terminal 12b' of the particular gate electrode 12b connected to the driving pulse input pads 8 and 9 in all the gate electrodes of the TFT's 11 and 12 forming the resistors 10 is protruded from the short-circuiting wire 13 and different therefrom in respect that the leading terminal 12b' is tapered forwardly.

In the liquid crystal display device of this embodiment, since the leading terminal 12b' is tapered forwardly, the local damage by static electricity is more liable to occur at the leading terminal 12' and the possibility that the address wires 2 and data wires 3 leading to the gate electrodes 12b will be short-circuited to the short-circuiting wire 13 is further lessened.

Figure 25:
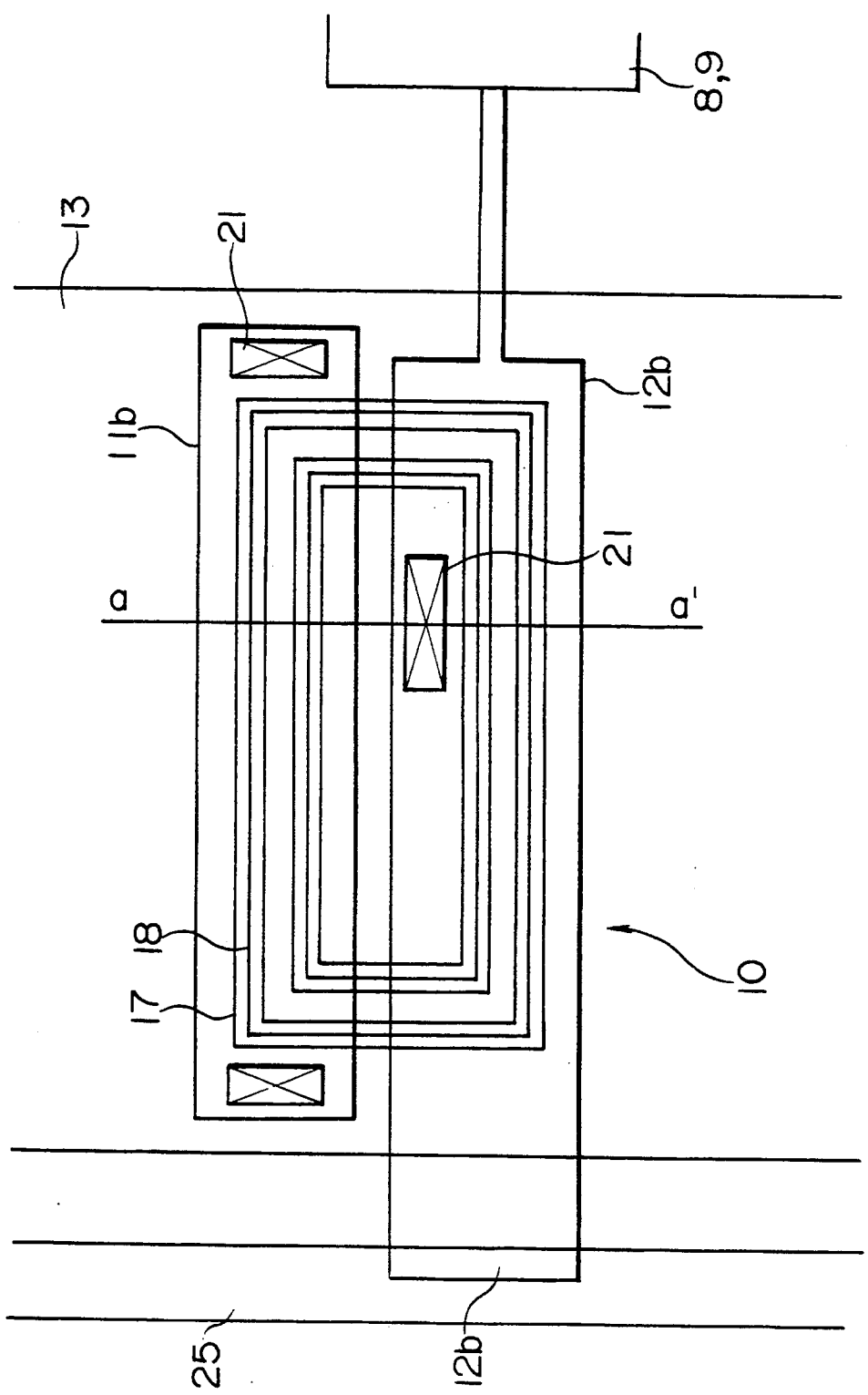
FIG. 25 is a plan view of a TFT resistance part of the 17th embodiment of this invention.

Now, the 17th embodiment of this invention will be described below with reference to FIG. 25.

The liquid crystal display device illustrated in this diagram is identical in construction to that of the 13th embodiment in respect that the leading terminal 12b' of the particular gate electrode 12b connected to the driving pulse input pads 8 and 9 in all the date terminals of the TFT's 11 and 12 forming the resistors 10 is protruded from the short-circuiting wire 13 and different therefrom in respect that the leading terminal 12b' of the gate electrode 12b is connected to a ring 25 made of a-Si outside the short-circuiting wire 13.

The ring 25 made of a-Si serves the purpose of preventing static electricity from manifesting its effect on the wires. When the damage done to the insulating film by static electricity is suffered to establish a short-circuit between the ring 25 made of a-Si and the gate electrode of the resistor 10, the ring 25 made of a-Si which possesses amply high resistance manifests no effect either during the electrical test or during the lighting of the liquid crystal display device with the resistors 10 left intact.

Now, the 18th embodiment of this invention will be described below.

The liquid crystal display device of this embodiment has set in any of the embodiments cited above and the conventional liquid crystal display devices the magnitude of resistance of each of the resistors formed of TFT's in the range between 10 k$\Omega$ and 100 M$\Omega$ on the condition that the potential difference between the opposite terminals of the resistor is 20V. If the magnitude of resistance falls short of 10 k$\Omega$, the determination of the TFT characteristic within the display region is attained only with difficulty. If this magnitude exceeds 100 M$\Omega$, the device in the process of production is easily susceptible of the effect of static electricity and the picture of display tends to be degraded in quality more conspicuously.

Figure 26:
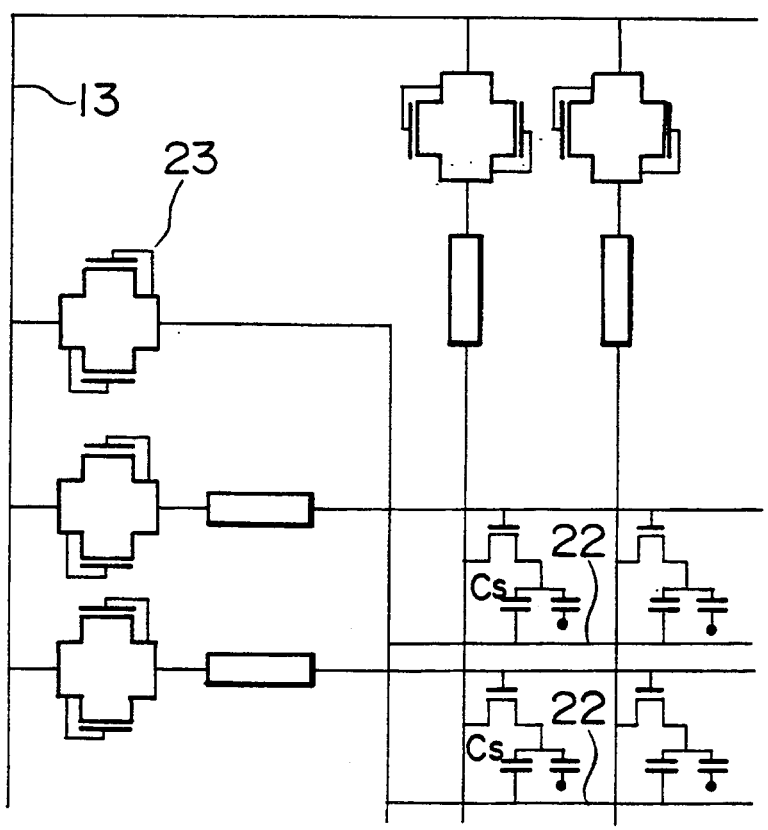
FIG. 26 is an equivalent circuit diagram of a modified example of this invention.

The embodiments cited thus far represent varying cases of application of this invention to the liquid crystal driving active matrix substrate of the construction destitute of an auxiliary capacitance. Optionally, this invention may be applied to a liquid crystal driving active matrix substrate which is so constructed as to possess an auxiliary capacitance Cs as illustrated in FIG. 26.

Figure 27:
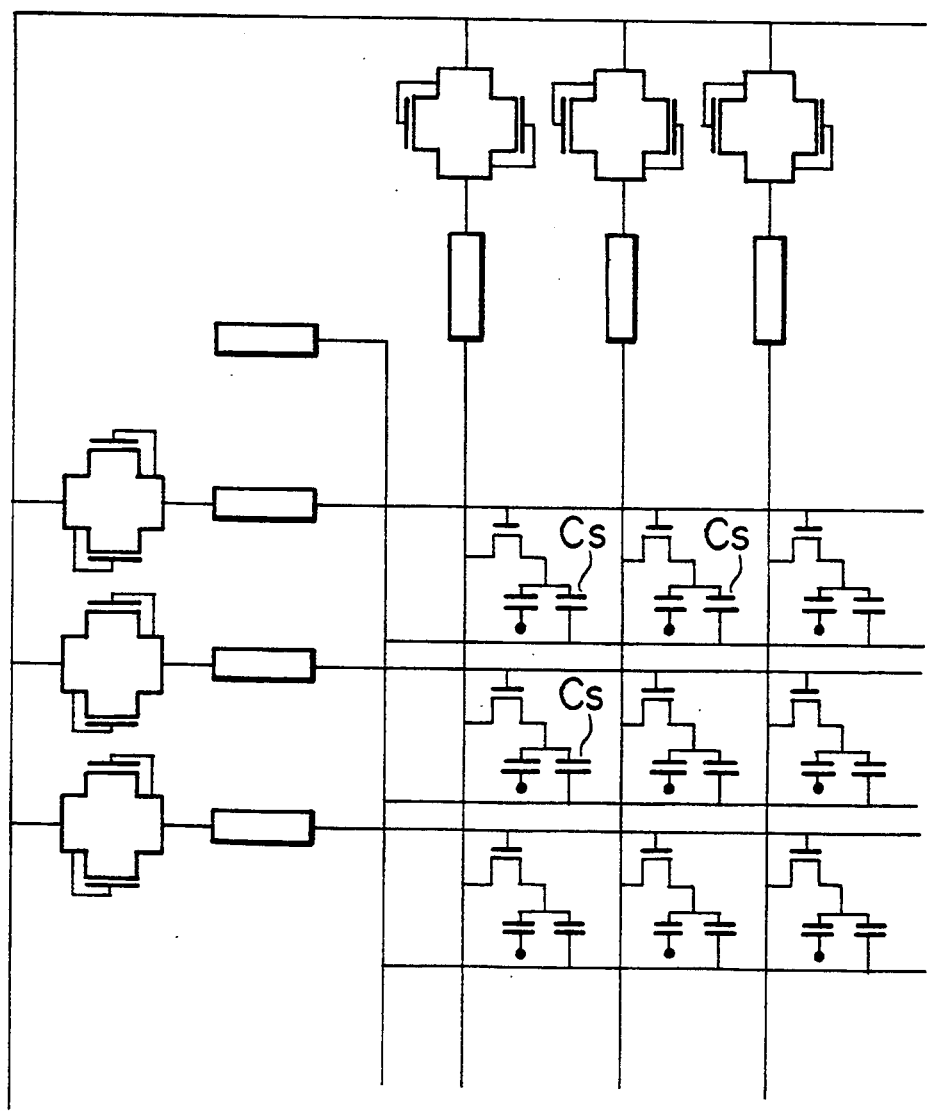
FIG. 27 is an equivalent circuit diagram of another modified example of this invention.
Figure 28:
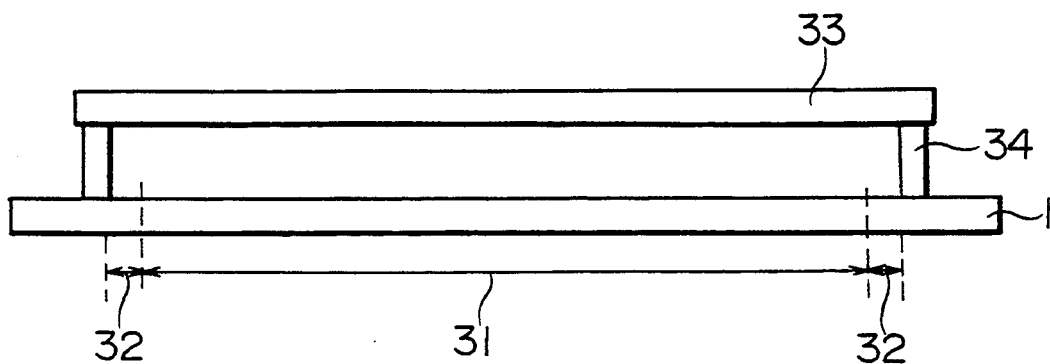
FIG. 28 is a front view of a modified example of this invention.
Figure 29:
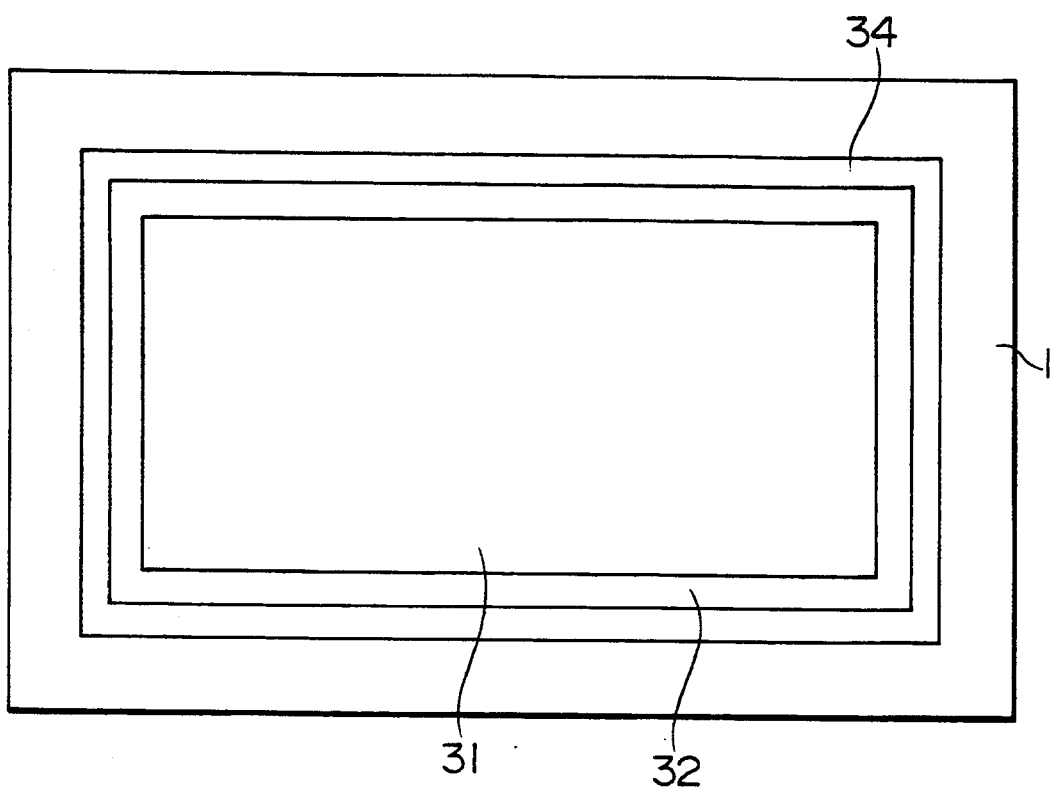
FIG. 29 is a plan view of another modified example of this invention.

In this case, auxiliary capacitance wires 22 may be adapted to be connected severally via resistors 23 to the short-circuiting wire 13 as illustrated in FIG. 27. The invention of this mode can be applied effectively to the conventional liquid crystal display device. By allowing the resistors 23 and the short-circuiting wire 13 to remain intact after completion of the device as a finished product, the characteristic of the auxiliary capacitance Cs to resist static electricity can be improved. The capacitance of the device per unit area can be increased, therefore, by decreasing the thickness of the insulating film of the auxiliary capacitance Cs.

Further, the connection of the resistors may be made near the opposite terminals of a relevant wire or near either of the opposite terminals.

This embodiment has been depicted as a case of construction having each resistor 10 interposed between a bonding pad and a short ring. In case where the resistors 10 are to be left unsevered after the liquid crystal display device is completed, they need not interconnect the bonding pad and the short ring but may be formed at any position outside the display region. The magnitude of resistance can be stably maintained when the short rings and the resistors 10 are located in the region intervening between the bonding pads and the display region, for example.

The resistors 10 may be formed in a region 32 of liquid crystal falling outside the display region 31. In this case, the resistors 10 are not affected by light because they are shielded with a black matrix superposed on a counter substrate 33 and the resistors 10 are enabled to maintain a stable magnitude of resistance because they are retained under a fixed circumstance of liquid crystal. The reference numeral 34 stands for a sealing member.

As the insulating substrate, a quartz substrate, a silicon wafer, a plastic sheet, etc. may be usable in addition to the glass substrate. Especially when the silicon wafer is adopted, the insulating substrate is completed by having an insulating film superposed on the silicon wafer.

This invention can be applied as effectively to a reflection type liquid crystal display device as to the transmission type liquid crystal display device having a driving circuit formed on an insulating substrate. In the case of the reflection type liquid crystal display device, the substrate needs not be an insulating transparent substrate.

As described above, this invention can prevent the short-circuiting wire and the thin-film transistors from the trouble of disconnection or short-circuit due to physical damage or damage caused by static electricity and can enhance the reliability of performance. It also allows a dimensional reduction of the insulating substrate.

What is claimed is:

1. A liquid crystal display device comprising:
   an insulating substrate manifesting an insulating property at least on a surface thereof;
   a plurality of address wires formed in a display region on said insulating substrate;
   a plurality of data wires formed to intersect said address wires;
   first thin-film transistors formed one each at points of intersection of said address wires and data wires and having gate electrodes electrically connected to said address wires and drain electrodes electrically connected to said data wires;
   picture element electrodes formed one each near said points of intersection and electrically connected to the source electrodes of said first thin-film transistors; and
   a short-circuiting wire formed along at least part of a periphery of the display region of said insulating substrate and adapted to short-circuit said address wires and data wires to each other through a first resistor made of a second thin-film transistor, said short-circuiting wire formed along at least part of the periphery of the display region of said insulating substrate and being electrically connected such that a portion of said short-circuiting wire surrounds the first resistor made of the second thin-film transistor, a part of the short-circuiting wire being formed inside of the first resistor.

2. A liquid crystal display device according to claim 1, wherein said short-circuiting wire is formed in a shape of a ladder along the periphery of said insulating substrate, and the first resistors made of the second thin-film transistor are formed as openings in the ladder shaped short-circuiting wire.

3. A liquid crystal display device according to claim 1, wherein a magnitude of resistance of said first resistor made of the second thin-film transistor is set in a range between 10 kΩ and 100 MΩ when a potential difference between opposite terminals of said first resistor is 20V.

4. A liquid crystal display device according to claim 1, further comprising an auxiliary capacitance.

5. A liquid crystal display device according to claim 4, wherein an auxiliary capacitance line for each auxiliary capacitance is connected to said short-circuiting wire through a second resistor made of a third thin-film transistor.

6. A liquid crystal display device comprising:
   an insulating substrate manifesting an insulating property at least on a surface thereof;
   a plurality of address wires formed in a display region on said insulating substrate;
   a plurality of data wires formed to intersect said address wires;
   first thin-film transistors formed one each at points of intersection of said address wires and data wires and having gate electrodes electrically connected to said address wires and drain electrodes electrically connected to said data wires;
   picture element electrodes formed one each near said points of intersection and electrically connected to the source electrodes of said first thin-film transistors; and
   a short-circuiting wire formed along at least part of a periphery of the display region of said insulating substrate and adapted to short-circuit said address wires and data wires to each other through a first resistor made of a second thin-film transistor;
   wherein said second thin-film transistor has a first part of opposite source and drain electrodes and a second part of opposite source and drain electrodes distinct from said first part, the second part of opposite source and drain electrodes being more easily broken by static electricity than the first part of opposite source and drain electrode.

7. A liquid crystal display device according to claim 6, wherein said second thin-film transistors are comb-shaped having the first part of opposite source and drain electrodes as fingers and said short-circuiting wire is comb-shaped and interleaved with the comb-shaped second thin-film transistor.

8. A liquid crystal display device according to claim 7, wherein the fingers of said comb-shaped source electrodes and drain electrodes are electrically connected to a bus bar formed in a lower layer through separate through holes.

9. A liquid crystal display device according to claim 8, wherein a gate electrode of the first resistor made of the second thin-film transistor has a square shape and said gate electrode covers the fingers of said comb-shaped source electrodes and drain electrodes.

10. A liquid crystal display device according to claim 6, wherein a-Si is a component element of said first resistor made of the second thin-film transistor and has a rectangular shape.

11. A liquid crystal display device according to claim 6, wherein a magnitude of resistance of the first resistor made of the second thin-film transistor is set in a range between 10 kΩ and 100 MΩ when a potential difference between opposite terminals of said first resistor is 20V.

12. A liquid crystal display device according to claim 6, further comprising an auxiliary capacitance.

13. A liquid crystal display device according to claim 12, wherein an auxiliary capacitance wire for each auxiliary capacitance is connected to said short-circuiting wire through a second resistor made of a third thin-film transistor.

14. A liquid crystal display device comprising:
an insulating substrate manifesting an insulating property at least on a surface thereof;
a plurality of address wires formed in a display region on said insulating substrate;
a plurality of data wires formed to intersect said address wires;
first thin-film transistors formed one each at points of intersection of said address wires and data wires and having gate electrodes electrically connected to said address wires and drain electrodes electrically connected to said data wires;
picture element electrodes formed one each near said points of intersection and electrically connected to source electrodes of said first thin-film transistors; and
a short-circuiting wire formed along at least part of a periphery of the display region of said insulating substrate and adapted to short-circuit said address wires and data wires to each other through a first resistor made of a second thin-film transistor, wherein the short-circuiting wire surrounds the second thin-film transistor except that a gate-electrode of the second thin-film transistor protrudes outside the short-circuiting wire.

15. A liquid crystal display device according to claim 14, wherein the gate electrode of the second thin-film transistor is protruded from said short-circuiting wire by causing a part of said short-circuiting wire near the gate electrode to be formed in an inwardly depressed shape.

16. A liquid crystal display device according to claim 14, wherein said gate electrode of the second thin-film transistor is possessed of a constriction.

17. A liquid crystal display device according to claim 14, wherein the gate electrode of the second thin-film transistor is tapered.

18. A liquid crystal display device according to claim 14, wherein the gate electrode of the second thin-film transistor is connected to a ring made of a-Si outside said short-circuiting wire.

19. A liquid crystal display device according to claim 14, wherein a magnitude of resistance of said first resistor made of the second thin-film transistor is set in a range between 10 kΩ and 100 MΩ when a potential difference between opposite terminals of said first resistor is 20V.

20. A liquid crystal display device according to claim 14, further comprising an auxiliary capacitance.

21. A liquid crystal display device according to claim 20, wherein an auxiliary capacitance wire for each auxiliary capacity is connected to said short-circuiting wire through a second resistor made of a third thin-film transistor.

* * * * *